(12) United States Patent
Haltovsky et al.

(10) Patent No.: US 8,480,469 B2
(45) Date of Patent: *Jul. 9, 2013

(54) ELECTRONIC GAMING PLATFORM HAVING PHYSICAL GADGET

(75) Inventors: Moshe Haltovsky, Petah-Tikva (IL); Avi Haltovsky, Givat-Shmuel (IL); Shmuel Assa, Sunnyvale, CA (US)

(73) Assignee: Quado Media Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,761

(22) Filed: Apr. 30, 2012

(65) Prior Publication Data

US 2012/0220354 A1    Aug. 30, 2012

Related U.S. Application Data

(62) Division of application No. 12/612,637, filed on Nov. 4, 2009, now Pat. No. 8,226,476.

(60) Provisional application No. 61/193,189, filed on Nov. 4, 2008.

(51) Int. Cl.
*A63F 9/24*    (2006.01)

(52) U.S. Cl.
USPC ............... 463/16; 463/30; 463/31; 463/33

(58) Field of Classification Search
USPC ........................... 463/16, 30, 31, 33
See application file for complete search history.

(56) References Cited

U.S. PATENT DOCUMENTS

| 5,752,005 | A  | 5/1998  | Jones |
| 5,790,371 | A  | 8/1998  | Latocha |
| 6,011,545 | A  | 1/2000  | Henderson |
| 6,222,507 | B1 | 4/2001  | Gouko |
| 6,377,228 | B1 | 4/2002  | Jenkin |
| 6,476,733 | B1 | 11/2002 | Amiri |
| 6,484,309 | B2 | 11/2002 | Nowlin, Jr. |
| 6,982,728 | B1 | 1/2006  | Nicolas |
| 7,028,305 | B2 | 4/2006  | Schaefer |

(Continued)

FOREIGN PATENT DOCUMENTS

| DE | 4127159 A1 | 2/1993 |
| JP | 7222868 A  | 8/1995 |

(Continued)

OTHER PUBLICATIONS

International Search Report for PCT/US2009/063312, dated Jan. 6, 2010.

(Continued)

*Primary Examiner* — Pierre E Elisca
(74) *Attorney, Agent, or Firm* — Nixon Peabody LLP; Joseph Bach, Esq.

(57) ABSTRACT

An electronic gaming system configured for executing an electronic game using physical gadget. The electronic gaming system has a gaming console which runs an electronic game. A physical gadget has a wireless transmitter that transmitting an outcome value. The main console receives the outcome value over wireless communication from the gadget, and advances the flow of the game according to the outcome value. Examples of the physical gadget may be a die, a clock, and a game piece, having a transmitter that transmits to the console an outcome value, e.g., rolling of a die or time from a clock.

20 Claims, 19 Drawing Sheets

U.S. PATENT DOCUMENTS

| | | | |
|---|---|---|---|
| 7,387,571 | B2 | 6/2008 | Walker |
| 7,771,286 | B2 | 8/2010 | Campadore |
| 8,016,681 | B2 | 9/2011 | Yoshino |
| 8,121,642 | B2 * | 2/2012 | James et al. .................. 455/557 |
| 8,226,476 | B2 | 7/2012 | Haltovsky et al. |
| 2002/0113751 | A1 | 8/2002 | Knopf |
| 2005/0017949 | A1 | 1/2005 | Dunn |
| 2005/0093768 | A1 | 5/2005 | Devos |
| 2005/0178034 | A1 | 8/2005 | Schubert |
| 2006/0044286 | A1 | 3/2006 | Kohlhaas |
| 2006/0068865 | A1 | 3/2006 | White |
| 2006/0100021 | A1 * | 5/2006 | Yoshino et al. .................. 463/45 |
| 2006/0172801 | A1 | 8/2006 | Hussaini |
| 2007/0021185 | A1 | 1/2007 | Walker |
| 2007/0077985 | A1 | 4/2007 | Walker |
| 2007/0097016 | A1 | 5/2007 | McGowan |
| 2007/0123207 | A1 | 5/2007 | Terlizzi |
| 2007/0182663 | A1 | 8/2007 | Biech |
| 2008/0013265 | A1 | 1/2008 | Kim |
| 2008/0216064 | A1 * | 9/2008 | Braswell ..................... 717/149 |
| 2010/0271458 | A1 | 10/2010 | Shethia |

FOREIGN PATENT DOCUMENTS

| | | | |
|---|---|---|---|
| KR | 20040101962 | A | 12/2004 |
| WO | 2004075428 | A2 | 9/2004 |
| WO | 2008154433 | A1 | 12/2008 |

OTHER PUBLICATIONS

Carsten Magerkurth, et al., "Towards the Next Generation of Tabletop Gaming Experiences," Proceedings of Graphics Interface 2004, ACM International Conference Proceeding Series; vol. 62. Ontario, Canada, May 17-19, 2004, pp. 73-80.

Tara Whalen, "Playing Well with Others: Applying Board Game Design to Tabletop Display Interfaces," UIST 2003. Vancouver, Nov. 2-5, 2003.

Sebastian Pape, et al., "Single Display Gaming: Examining Collaborative Games for Multi-User Tabletops," Workshop on Gaming Applications in Pervasive Computing Environments at Pervasive '04, Vienna, Austria, (2004).

Edward Tse, et al., "Multimodal Multiplayer Tabletop Gaming," Proceedings Third International Workshop on Pervasive Gaming Applications (PerGames '06), in conjunction with 4th Intl. Conference on Pervasive Computing, May 7th Dublin, Ireland. pp. 139-148.

Carsten Magerkurth, et al., "Stars—A Ubiquitous Computing Platform for Computer Augmented Tabletop Games," Video Track and Adjunct Proceedings of the 5th International Conference on Ubiquitous Computing (UBICOMP'03), Seattle, Washington, USA, Oct. 12-15, 2003.

James Ransom-Wiley, "Philips Entertaible melds video gaming with traditional board gaming," Engadget, http://www.engadget.com/2006/01/04/philips-entertaible-melds-video-gaming-with-traditional-board-ga/.

Clim J. de Boer, et al., "Electronic Augmentation of Traditional Board Games," Leiden Institute for Advanced Computer Science, Leiden University, pp. 441-444, 2004.

Regan L. Mandryk et al., "False Prophets: Exploring Hybrid Board/Video Games," Computing Science, Simon Fraser University, pp. 640-641, 2002.

Garth B. D. Shoemaker et al., "Single Display Privacyware: Augmenting Public Displays with Private Information," Edge Lab. School of Computing Science, Simon Fraser University, pp. 522-529, 2001.

Office Action issued in U.S. Appl. No. 12/612,637, dated Nov. 2, 2011.

Notice of Allowance issued in U.S. Appl. No. 12/612,637, dated May 17, 2012.

Office Action issued in U.S. Appl. No. 13/460,768, dated Oct. 18, 2012.

* cited by examiner

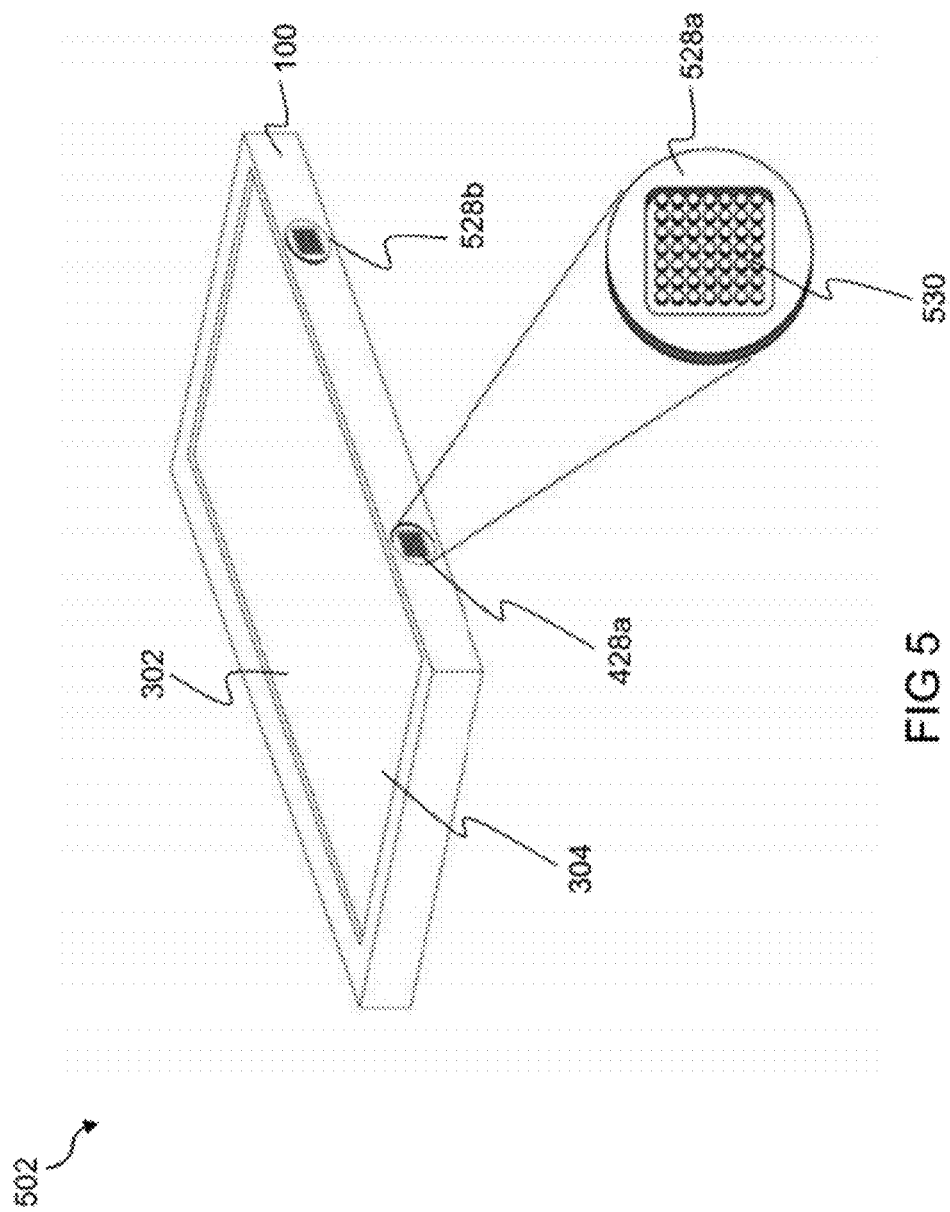

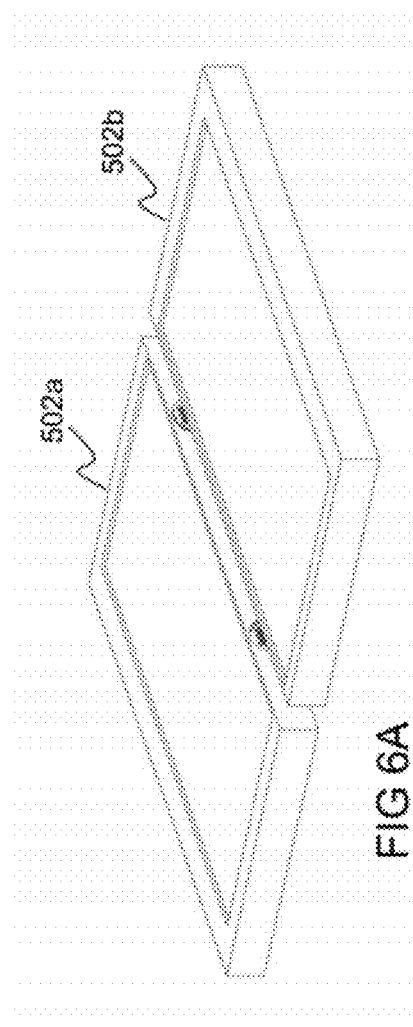
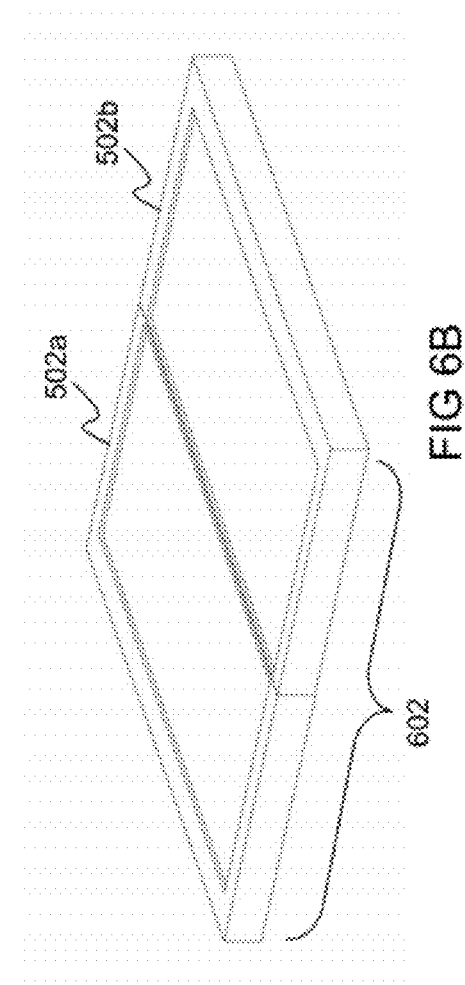

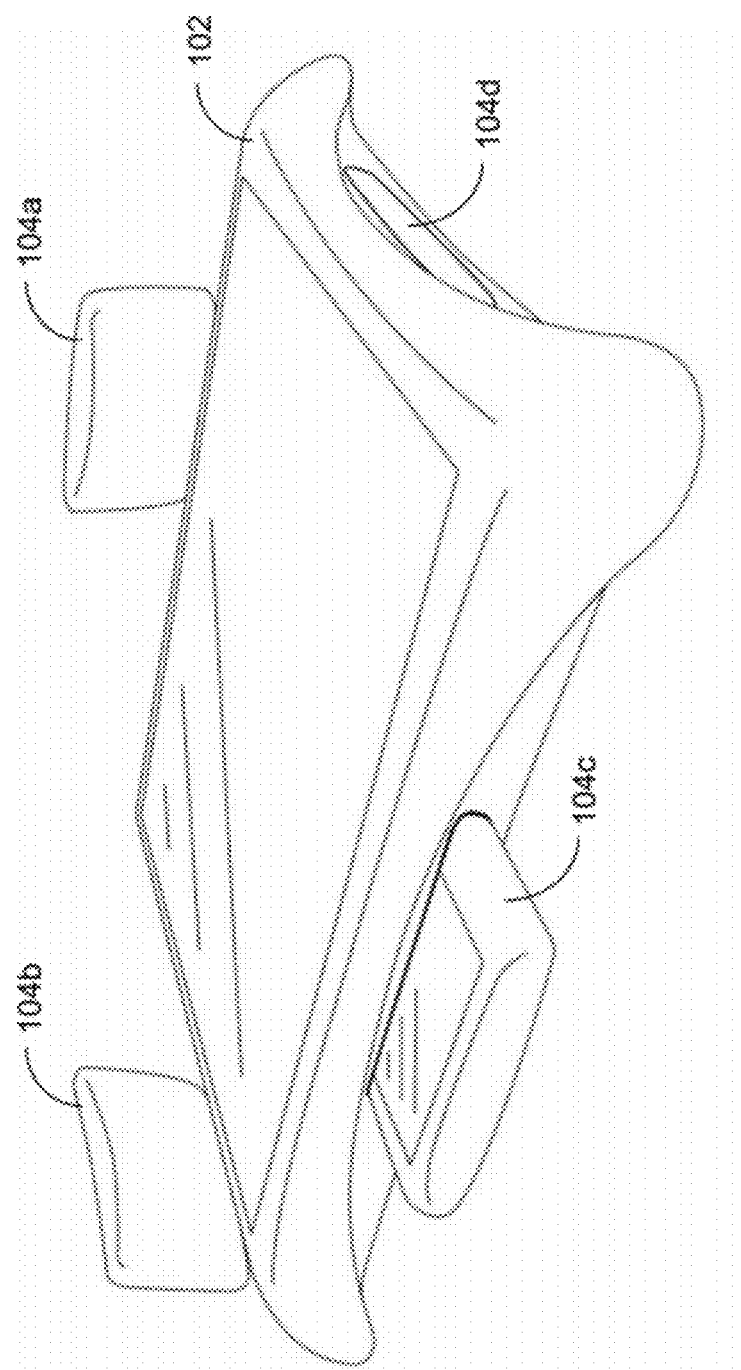

ELECTRONIC GAMING PLATFORM HAVING PHYSICAL GADGET

RELATED APPLICATIONS

This application is a divisional of U.S. patent application Ser. No. 12/612,637, filed on Nov. 4, 2009, now U.S. Pat No. 8,226,476 and which claims priority benefit from U.S. Provisional Patent Application Ser. No. 61/193,189, filed on Nov. 4, 2008.

BACKGROUND

1. Field of the Invention

This invention relates generally to a multi-player, multi-screens digital gaming platform for enabling digitally playing a multi-player social games in multiple screens possibly running on different hardware platforms.

The use of "social games" refers to inter personal social games including digital versions of traditional and new board, card, dice, and similar games.

2. Related Arts

Electronic augmentation of traditional board games has been an active area of research and product development, as electronic board games offer certain additional advantages without affecting, and often enhancing, the fundamental enjoyment factors of the traditional games. Some of the advantages include enhanced player interaction support, compact board footprint for playing and storing the game, ability to load multiple games on the same board, no loose game-pieces to be lost, easy on-demand access to digitally stored information regarding game rules and strategy suggestions, real-time game status updates, etc. These advantages are applicable to both single-player board games, and multi-player board games.

Traditional multi-player board and card games, such as, Scrabble, Monopoly, Risk, Chess, Texas Hold'em etc., and more recent designer board games, such as, Settlers of Catan, Apples to Apples, Uno etc., promote live social interaction among two or more players. The social interaction experience is different from the experience of playing computer or electronic games designed to enable a single player to interact with a machine and/or Internet players. Often a collaborative/competitive multi-player board game experience is more desired by the players than the isolation typically associated with a computer/electronic game.

Therefore, what is needed is a crossover gaming platform that offers the merits of conventional games, while adding digital features that enrich the game-playing experience, as well as provide practical conveniences, such as versatility and ease of storage.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The present application discloses recommended processes and systems for the implementation of multi players, multi screens gaming system. The gaming system is suitable for playing locally traditional and new board, card, dice, and similar social games, but it can be applied for other type of games and social applications.

Various embodiments of the gaming system involve hardware and software implementations. The hardware implementation includes board and terminal components, which may be proprietary or conventional. The software implementation includes board and terminal subsystems. The software implementation may also include dedicated user interface and software development services. The software implementation is transparent to the hardware deployments; therefore the software implementation requires OS specific adaptation.

Hardware

"Board"

The purpose of the gaming system "Board" is to display the shared part of the game (e.g. the Monopoly board). The "Board" can be horizontal and controlled by touch gestures (similar to Tablet) or vertical/frontal and controlled by custom controller. Multiple boards can be assembled together physically or logically by the "gaming system software" (see description below) to provide bigger shared area. The "Board" can be proprietary or conventional horizontal or frontal display including tablet, pc monitor, TV monitor, etc. In case the "Board" hardware is "TV", it requires attached processing unit that can run standard OS and wireless connectivity to the internet and locally to communicate with the players terminals. Such processing unit can be PC, Media Center (e.g. Apple TV™), Game Console (e.g. Sony PlayStation™, Microsoft XBOX™, or Nintendo Wii™), Set top box (e.g. Tivo™), or embedded unit on the TV itself.

"Terminal"

The purpose of the gaming system "Terminal" is to display private parts of the game (e.g. the Scrabble tiles or Texas Hold'em cards), to perform private activities (e.g. consulting English dictionary in Scrabble, taking notes in the Clue game, or Simulate few chess moves), and to control frontal "Boards". The scope of the invention is not limited by the number of game terminals. Also, any type of smart personal device with a display, such as, a smart phone (e.g. iPhone™), a PDA (e.g. iPod Touch™), a personal media player (e.g. Nintendo DS™), etc., may be used as the game terminal, as long as the device is running the "Terminal subsystem software" (sometimes also referred to as "augmentation layer") that is described below.

Dedicated Hardware Design

The purpose of dedicated hardware is to provide optimized experience of digital board and user terminals in dimensions and usability. The dedicated hardware is portable and packages together in compact way at least 1 board and 4 terminals. The dedicated hardware may include few boards and physical connectors to attach them. The physical connectors may be used to exchange data and power. In case of multiple boards, some of the boards may be dumb, used for surface extension (both display and inputs), and are fully controlled by their hosting board. The dedicated hardware supports single charging point of all the system components.

Special Purpose Hardware Gadgets

The gaming system may include special purpose hardware gadgets that can communicate their outcome over wireless communication and impact the game play. Examples of such gadgets are physical dice, game pieces, sand clock, or "live" avatar that has unique role in the game.

Software

The "gaming system software" is in essence abstract operating system that consists of "Board subsystem" and "Terminal subsystem", runs on variety of hardware platforms, and implements hardware agnostic gaming services.

Objects Exchange

The "gaming system software" provides seamless movement of digital objects between the system screens, including board-to-board, board-to-terminal, terminal-to-board, and terminal-to-terminal. The objects exchange depends on the game play rules. Objects can move as is (e.g. Monopoly money) or follow some transformation rule (e.g. flip Scrabble tile, show Poker card). Objects exchange can trigger some game rule (e.g. decide on the winner in Card games). Object exchange can create unique experience like dice shake on the "Terminal" (using the accelerometer) that virtually continues on the "Board" taking into account the magnitude and direction of force applied by the user action. Example of game objects are tiles, cards, chips, money, drawings, avatars, etc.

"Board Subsystem"

The "Board subsystem" provides system administration, players management, and game management services. The "Board subsystem" loads games from local and web game repositories. The "Board subsystem" enforces the user rights to the games and manages the accounting between the user and games providers. The "Board subsystem" manages intelligent cache of game assets and automatic updates of game features. The "Board subsystem" displays the shared part of the games and handles the game play. The "Board subsystem" provides set of gestures and features to enrich the game play, including drag-and-drop, flip an object, spin an object, rotates the board to the user side (may be applied automatically as part of the game play), etc. The "Board subsystem" utilizes the full screen for the game play and enables to access the system navigation and configuration functions through floating dashboard that can be launched anytime from pre-defined hot key (e.g. <Esc>) or hot spot on the game board, e.g. the bottom left corner. The "Board subsystem" handles the communication and assets exchange with the players' terminals and optionally with additional boards. The "Board subsystem" manages list of permanents and ad-hoc players including personal preferences (name, avatar, color, etc.), favorite games, and statistics (for each game: # of plays, wins, looses, points, etc.). The player personalized information may be imported automatically in case of ad-hoc players with smart phones and PDAs. The "Board subsystem" publishes its availability and therefore can be discovered by other "Board subsystems" and "Terminal subsystems". The other "party" requests to join the board (in case of "Terminal") or share the board display (in case of other "Board"), and the board user needs to approve it. That process is necessary in case of multiple boards' environment like video arcades, game board Café', etc.

The "Board subsystem" is the center of the game system and provides software services to its satellites "Terminal subsystems" including necessary game assets (the "Terminal subsystem" is not dealing with games downloads or licensing), list of known players (for the link of player to terminal), list of available colors (as part of the player personalization or game setup process), list of other terminals (to enable terminal-to-terminal communication) etc.

Multiple Boards

The "Board subsystem" discovers automatically other "Board subsystems" that it can utilizes their display area. The "Board subsystem" requires the approval of the other "Board subsystems" to utilize their display area. In case that multiple "Board subsystems" agree to share resources, the "Board subsystem" that starts a game, take control on others and handle the game flow.

Multiple "Board subsystems" can work in few configurations, 1) create bigger view of the same skin where each "Board subsystem" display and get inputs on part of the display, 2) enable multiple boards' games, e.g. playing few Monopoly boards and create expanded game play, 3) enable peer-to-peer boards games, where each player enjoy full board experience in games like Battleships or Stratego, 4) create exact duplication of the game board to support many players experience, maybe in different locations, etc.

Positioning Process

The "Board subsystem" manages the players' position on the board. The process may start with the collection of players with terminals or the definition of current players on the board (e.g. in case of Chess the terminal is not mandatory). Players positioning view shows a "symbol" for each player and let the users drag their symbols to their preferred side on the board. The process supports any number of players that can share the same side. The above process defines the area in which the player objects will be exchanged with the board, e.g. when he/she drop tiles from his terminal to the board, or drags cards from the board to his terminal.

In many games, the "Board subsystem" manages the turn of the players. When the turn is well defined, multiple players can share the entire side for drag-and-drop actions (vs. using fraction of the side depends on the number of players).

The above process is necessary before any game starts and can be altered during the game. The defined positions and drag-and-drop areas may be viewed during the game as names, colors, avatars, and/or players pictures as additional "players' layer" on top of the board area and may have different variants on different games.

In some games, when it's important that all players will know each other assets/status (e.g. chips in Poker, cash in Monopoly, or score in many games), the "players' layer" may show in addition to their names, colors etc., their assets/status.

Alternatively, the above players' details can be defined as "players' box" that can be dragged to any area in the board and thereafter used as the players' "gate" to the board (e.g. in Poker it makes more sense to position the "players' box" adjacent to the table vs. the frame of the display).

"Terminal Subsystem"

The "Terminal subsystem" searches for available "Boards" in the area and enables the user to connect to one or few of them. The "Terminal subsystem" enables the user to personalize his name, symbol, color, and position on the "Board". The "Terminal subsystem" receives the game assets from the "Board subsystem". The "Terminal subsystem" displays the player private data (e.g. Tiles in Scrabble or Poker Cards). The "Terminal subsystem" provides private actions like browsing electronic dictionary, game rules, or potential game strategies. For example, it enables the user to take private notes related to the game (e.g. in the Clue game). In another example, it enables the user to simulate privately potential game steps (e.g. in Chess) without the steps being implemented on the actual game played. As the game progresses, the user may activate one or more of the simulated moves, so that they are actually performed in the game played. Alternatively, the user may change the simulated moves according to new moves that were actually enacted in the game played. The simulated moves can be saved in the memory, e.g., RAM, and the processor can enable the user to switch between "real" game view and "simulated" game view. The "Terminal subsystem" exchanges game objects with the board or other terminals. The "Terminal subsystem" enables in some games to share private information with other players' terminals, either by sharing the entire view or exchanging individual objects and widgets. The "Terminal subsystem" supports touch gestures and hand writing; the hand writing drawings and lists can be exchanged as other game objects.

Remote Control

The "Terminal subsystem" may include remote mouse and custom controller of the board view. The custom controller can be generic by sharing the entire view (like Webex™) or game oriented by exchanging the game gestures and actions (e.g. moving a tile on the controller will send "move tile action" to move the same tile on the shared board). To complete the experience, the "Board subsystem" needs to inform the "Terminal subsystem" about changes on the physical board, and the "Terminal subsystem" in exchange should update its user miniature view of the board. The custom controller support zoom and board shift to access easily any part of the bigger board. The terminal controller supports zoom and board shift to easily access any part of the main board. It also supports store and forward function that enables the user to prepare the next move privately before sending it to the main board. When the terminal is set for a view of the main bard, its processor may constantly synchronize the user miniature view of the main board with the main board subsystem.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 4-5 illustrate various external looks of a game board display unit that can be removably coupled to other game board display units, according to embodiments of the present invention.

FIGS. 6A-6B and 7A-7B illustrate how a plurality of game board display units can be coupled together to extend game playing surface, according to embodiments of the present invention.

FIG. 7C illustrates an embodiment of the game wherein the main board includes facility to contain the terminals.

DETAIL DESCRIPTION

Figure 1:
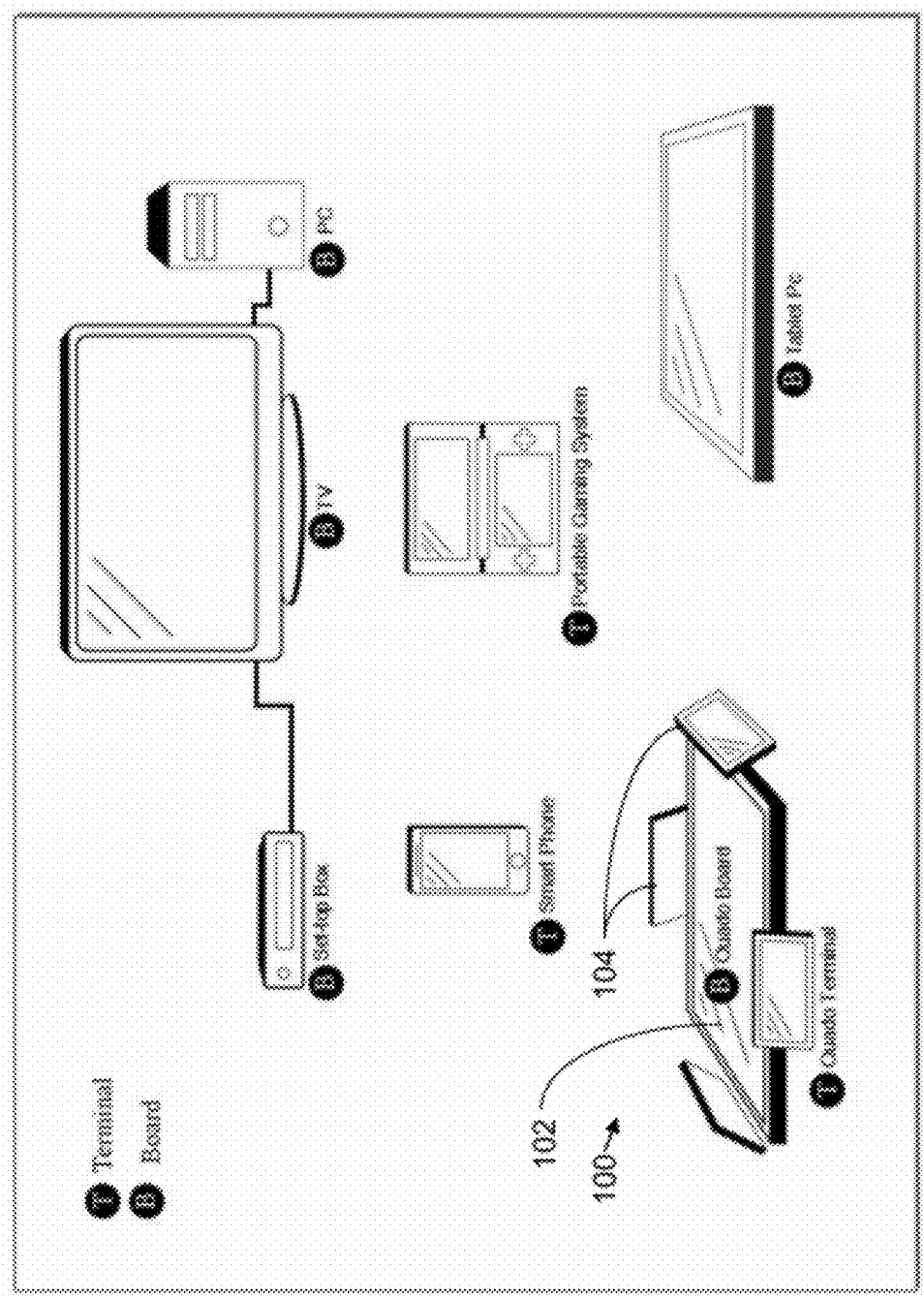
FIG. 1 illustrates various possible implementations of the inventive multi-screen, multi-player gaming system.

Various embodiments of electronic gaming systems, including the relevant hardware and software, are disclosed. In general, the disclosed system can be implemented on dedicated, specifically designed hardware, on commonly available hardware, or on mixture of dedicated and commonly available hardware. In this sense, the invention provides an orchestration system that manages communications and processes among the various hardware pieces which form the multi-screens aspect of the multi-player gaming system. The orchestration system can be implemented purely in software running on, e.g., general purpose computers, video game consoles, PDA's etc., (when no dedicated hardware is used), or in combination of software and dedicated hardware. The inventive system introduces an augmentation layer that enables required transactions among the various screen units. Therefore, the inventive system can be conceptualized as an augmentation layer running on top of the native OS, and a game application running on top of the augmentation layer. In this respect, the augmentation layer may be generic and indifferent to the specific game being played. In addition to features described in details herein, this implementation also enables the system to operate on various platforms, wherein each platform is running a different operating systems (OS). Also, in certain implementation a generic core enables certain generic actions required for all games. Once a player selects a game, the core takes appropriate actions to load elements required for the specifically selected game.

According to certain aspects of the invention, the system may be implemented as a portable electronic gaming system allowing a plurality of players to play a game on a plurality of screens. When the system is implemented as a dedicated hardware, the system comprises a game board having a main display screen for displaying a portion of the game layout that is shared by the plurality of players, and a plurality of personal game terminals, each personal game terminal assigned to a respective player and having an auxiliary display screen for displaying a portion of the game layout that is associated with the respective player. The system enables communication between the main display and the personal game terminals, and optionally also among the game terminals directly. The system also enables seamlessly transferring digitized game objects between the respective auxiliary display screens and the main display screen, or among the auxiliary display screens, as triggered by, e.g., a game step or in response to touch-based interactive inputs received from the plurality of players. The system may also transfer or initiate coded rules associated with the transferred digitized game objects. For example, the rules can indicate where on the screen the digitized game object should appear, at what size should it be displayed, special animation that should accompany the transfer of the digitized game object, etc.

According to another aspect of the invention, the electronic gaming system can also communicate with and implement a game using conventional hardware. For example, iPod™, iPhones™, PDA's, smart phones, etc., (generally referred to herein as "smart device") can serve as the personal game terminals and communicate with the dedicated hardware or other types of conventional hardware (e.g., Wii™, X-Box™, etc.). This is enabled, at least in part, by the inventive augmentation layer that enables transactions among hardware running on different platforms, and by the game application operating over the augmentation layer. As before, this arrangement allows for digitized game objects to move seamlessly among the plurality of personal game terminals and the main board in response to game rules/steps or interactive inputs received from the individual players.

According to yet another aspect of the invention, the gaming system may utilize a conventional display, such as a plasma or LCD television or monitor as the main screen, and utilizes dedicate, conventional, or a mix of dedicated and conventional personal game terminals.

FIG. 1 illustrates various possible implementations of the inventive multi-screen, multi-player gaming system. Elements that can function as a user terminal are indicated by (T), while elements that can function as the main board or console are indicated by (B). Shown at 100 is a system that is made of dedicated hardware, i.e., dedicated gaming board 102 and dedicated terminals 104. The board 102 and terminals 102 can function as a complete gaming system and are capable of communicating among each other. On the other hand, a conventional smart phone or a portable gaming system can also be used as user terminals and communicate with any of the boards shown in FIG. 1, provided that these terminals run the software modules described below. Similarly, a conventional PC, Tablet PC, set-top box, or a TV (either a "smart" TV or a regular TV functioning as a monitor and coupled to a set-top box, PC, conventional gaming console, etc.), may function as the main board, provided that these terminals run the software modules described below. Communication can be provided between and among any of the terminals and main board shown in FIG. 1.

Other embodiments and advantages of the present invention are discussed in the subsequent detailed description section.

Overview

The present application discloses a novel digitally-enhanced gaming platform for playing existing and new social games,. A typical gaming system comprises a main game display module and may have one or more personal game terminals having auxiliary game display modules and communicating with the main game display module. The personal game terminals may also communicate with each other. Various personal game terminals are enabled to exchange game-related information with other modules and to seamlessly move digitized game-specific pieces/objects (e.g., cards, tokens, tiles etc.) to other modules or to the main game display.

In certain embodiments, games can be played with shared public information displayed on the main game display module, and individual public/private information displayed on the auxiliary game display modules. In other embodiments, there is no main game display module, but a plurality of inter-communicating auxiliary game display modules are assigned to individual players.

The personal game terminals may be handheld devices, such as, smart phones, personal digital assistants (PDA), or dedicated personal game terminals assigned to individual players. The main game display module may be a portable dedicated digital game board, or may be part of an existing appliance, such as, a television screen or computer monitor coupled to a computer or game console (such as Nintendo Wii or Microsoft Xbox game consoles) running an appropriate gaming software. The main game display module may have other configurations, such as, a touch-screen-enabled tablet PC, or a laptop computer with a keypad, touchpad, trackball, etc. The digital board may be designed to be folded for portability and ease of storage. The main game display module may be a combination of one or more existing appliances and a dedicated digital game board.

The main game display module may be a single display unit, or a plurality of display units that can be coupled to each other. Coupling a plurality of display units to form the main game display module has the additional advantage of creating increased shared playing area that can accommodate more visual information related to the game. The plurality of display units may be physically pre-attached to each other by some fastening mechanism, such as, a hinge, a flexible backing tape, etc., or they may be removably attachable to each other, as required. When the plurality of display units are aligned together, the system automatically identifies the new structure and applies the game layout over the combined display units, forming a larger unified game surface. In one embodiment, a plurality of removably attachable display units can be used in at least the following ways: 1) two or more display units are used for public display, wherein digital game pieces can be seamlessly moved from one public screen to another, e.g., player finishes the game track on one public screens and continues to play on a second public screen, 2) one or more display units are combined to form a bigger display module displaying the shared playing area; 3) one or more display units are used individually as auxiliary game display modules, where the game does not necessarily need a shared playing area; 4) two or more screens that are duplicate of each other—this is especially beneficial for games played in teams, wherein each team receives one public screen having the same graphics as on the other public screens; 5) two or more screens that are calculated-duplicate of each other, i.e., part is duplicate and part is not according to certain game rules—this, for example, can be implemented for playing Submarines, where part of the screen is duplicated, but other part is hidden; etc.

A processor within the main display unit can implement a positioning process. According to this process, the processor of the main unit maps the physical location of every game unit, i.e., public and personal game units, with respect to the main unit and other units. To illustrate, the processor can utilize a North-South, East-West grid centered at the center of the main public screen. If four players with four personal game units are seated around the main screen, then the processor identifies each personal unit and maps them according to the North-South, East-West grid. To enable this mapping, the processor establishes a communication protocol to recognize each personalized game unit and to approve-disapprove its joining the game. If the personal unit was approved to join the game, the unit establishes a physical location for that unit. For example, the processor may display a symbol identifying this unit at a certain coordinate on the main screen. When the user of that unit is actually seated in a different location or would like to move to a different location, the user can "drag" the symbol on the main screen to a different location.

The above process is not limited to 4 players and supports the allocation of few players to the same side with virtual separation between them (e.g. Half-Half). Furthermore, the same process is applicable without physical game units, in case the entire game play is happening on the same board (e.g. Chess). In such case, virtual image/avatar of each player is used to define his/her position around the board.

As mentioned above, digital game pieces can be seamlessly moved among the various private and public screens.

For example, a user may move a game piece, e.g., a card, from his personal unit to the main unit using, e.g., an assigned button, softkey, or hand gesture. In this respect, the digital game pieces can be grouped into two type of digital game pieces: "dumb" game pieces, i.e., digital game pieces that have basically only graphical representation but no function, e.g., cards, chess game pieces, etc., and active or "intelligent" pieces, which have internal function, akin to a widget or applet, e.g., die, warrior, etc. Additionally, when a game piece is transferred from one terminal to another, whether personal or public, a rule set is implemented to that specific transfer. The rule set may include, for example, the location for displaying the object on the transferee screen (for example, at an indicated place on the public main game board, at a location closest to the player transferring the piece, etc.), the size of the object to display (for example, enlarge or reduce depending if moving from a small to large screen or vice versa), any motion of the piece (e.g., if moving a covered card from main screen to private screen, flip the card to reveal its face), enact action per game rule, (e.g., when moving money in Monopoly from private screen to bank at public screen, action can be activated, e.g., game piece goes out of jail if payment was made to get out of jail), activate audio corresponding to the game piece, etc.

Combining the positioning concept with the seamless motion of game pieces, according to one embodiment, during the positioning process the processor displays "gates" on the main screen for each player. The gates may be displayed graphically in any shape or form, as long as each gate is identified as corresponding to a personal unit or player participating in the game. Then, when a digital game piece is moved from the public screen to a personal screen, it is graphically moved on the public screen towards the gate corresponding to that specific personal unit. The reverse is also true: when a user moves a game piece from a personal unit onto the public screen, the game piece "enters" the public screen through the gate associated with that particular personal unit.

Combining the above with the natural game turns enables the players to use their entire side to exchange objects with the board, as compared with sharing the side with other players wherein each player gets a smaller defined gate.

Various Playing Configurations

The gaming system components can be used in different playing configurations allowing the player(s) to play different type of games.

Examples of different playing configurations are discussed below with specific game examples for each. In these examples, without limiting the scope of the invention, a dedicated digital game board is recited as the main game display module, and dedicated game terminals are recited as the auxiliary game display modules, for illustrative purposes.

Single-Unit or multi-Unit Game Board with no Personal Game Terminal

In this configuration, the game is played using only one game board, where one or more players play a game using a touch screen (or keypad, trackball, joystick, touchpad etc.) on the game board. The game board displays shared "public" playing area. The game board may be a single display unit. Alternatively, as discussed before, two or more display units may be combined together to expand the display area of the game board. Examples for games suitable for this configuration are Snakes and Ladders, Memory game, Chess etc.

In an extension of this configuration, multiple shared "public" game boards may be used. Examples of this configuration are strategy games like "the Settlers of Catan". Since a large public playing surface is often required, a multi-unit game board is often suitable for this configuration and game pieces may be moved seamlessly from one main board on one display unit to another main board on a second display unit.

Single-Unit or Multi-Unit Game Board with Personal Game Terminals

In this typical configuration, the single-unit or multi-unit game board is used for the game's shared "public" playing area, which all the players can see and use, and the personal game terminals are used for each player's personal playing area. The "personal" playing area may be "public", i.e., visible to other players, or may be "private", i.e., exposed only to a specific player and hidden from the other players. Personal "private" playing area may be selectively accessible by collaborators, but not by the competitors. The personal game terminals exchange information with the game board.

Examples for games suitable for this configuration are Monopoly, where the terminals are visible to all the players, yet hold the respective player's properties information (such as the money stack of a player), and Scrabble, where the terminals hold the respective player's letter tiles and this information is hidden from the rest of the players, and many card games, where the terminals hold the respective player's private cards.

Personal game terminals may be used for a variety of functions, including, but not limited to, privately browsing game rules, consulting game strategies from available suggestions, consulting references (e.g., looking up a dictionary in a Scrabble game), taking private notes (e.g. in the Clue game), planning privately the next game steps, and optionally, for remotely controlling the game-specific pieces/objects on the main board.

Multiple Game Boards used as Personal Game Terminals

In this configuration, there are a plurality of single-unit or multi-unit game boards. The game boards exchange information with one another. Personal game terminal functionalities may be available in each of the game boards, when each player holds his/her own board, and there is no separate main display module. In this configuration, the "public" playing area is displayed in all the single-unit or multi-unit game boards acting as personal game terminals, and the "private" playing area, if any, is superimposed or co-located with the public playing area.

Examples for games suitable for this configuration are Battleships. In the Battleship game, the public playing area is the main grid of the game, which is seen by all the participating players in their "Terminals". But, on top of that, individual players see their "private" game-related information hidden from the other players. Stratego is another example game suitable for this configuration.

Example Gaming System

Figure 1A:
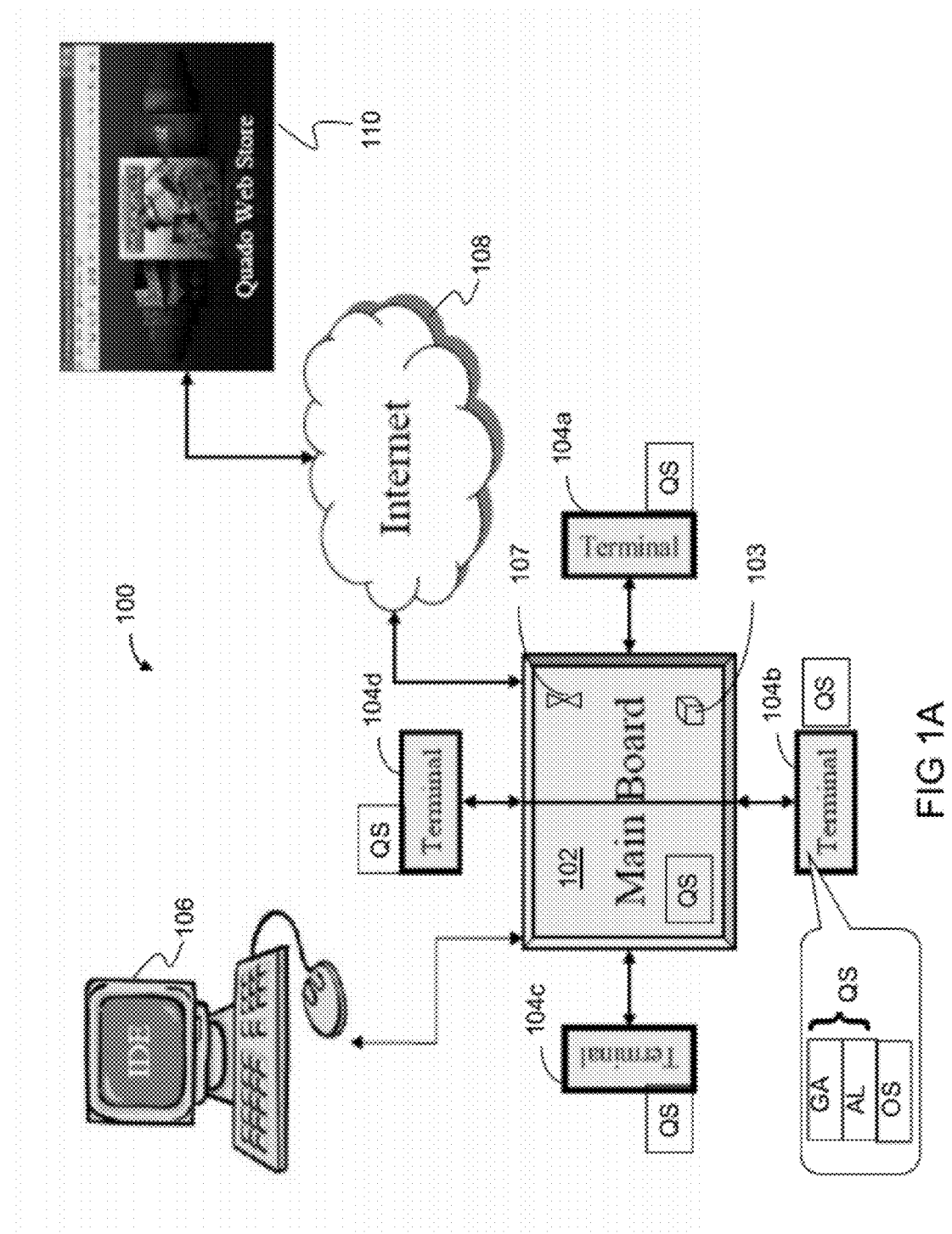
FIG. 1A illustrates components of an example game system with a main game board and multiple game terminals, according to an embodiment of the present invention.

FIG. 1A shows one example of a gaming system 100, according to an embodiment of the present invention. In this embodiment, the system comprises a main board 102 and several personal game terminals, here four are shown, 104a-104d. Each of the main board 102 and terminals 104a-104d runs a piece of software, indicated as QS, that enables execution and orchestration of various games, as selected by the users. In some circumstances, a general device, such as a PDA, smartphone, etc., can be used as a personal game terminal. In such a case, as shown in the callout of terminal 104b, an augmentation layer AS runs on the native OS, and a game application GA runs on the augmentation layer. The augmentation layer and game application can be conceptualized as the QS software.

In one example for implementing the system of FIG. 1A, the main game display module is a dedicated digital game board 102. Board 102 is used for displaying the game layout, such as, the grid in a Scrabble game, and for enabling 'public' game related activities, such as, moving publicly visible Scrabble tiles and composing words on the game grid. Board 102 may be a TFT-LCD (Thin film transistor-liquid crystal display) or LED panel digitally emulating a printed game board. Game objects or game-specific pieces (dices, tokens, cards etc.) are emulated by digital graphic images. The game board 102 may be placed horizontally allowing several players to sit around it and play just like they would have done when playing with the paper-printed version of the board game. The board 102 may comprise more than one display units. Each display unit is capable of being coupled to another unit even if no other unit is physically connected to it at a given time instance. When the multiple display units are physically or logically aligned and coupled together, the system automatically identifies the new expanded available display structure and applies the game layout over the combined display units, forming a larger unified playing surface, duplicating the main image, partly-duplicating the main image, etc.

The game terminals 104*a-d* are used by each player for 'private' game activities, such as, privately viewing his/her current set of tiles in a Scrabble game or Cards in Texas Holdem. Though four terminals are shown in FIG. 1A, the scope of the invention is not limited by the number of game terminals. Also, any type of smart personal device with a display, such as, a smart phone, a PDA, a personal media player, etc., may be used as the game terminal 104, as long as the device is running the QS software so as to be configured to communicate with the game board 102.

Players may interact with the system modules by using finger gestures (or a stylus) on the touch-screen on one or both of the game board 102 and the terminals 104. Alternatively, a keypad, a set of buttons, a joystick, a trackball etc., may be used to receive player input. The movement of game specific pieces, known collectively as game objects, between the game board 102 and the game terminals 104 should be seamless. For example, a Scrabble tile's digital image may be 'dragged' from a game terminal 104 and placed on the main Scrabble grid on the game board 102 using, e.g., a hand gesture on the touch screen of terminal 104.

According to one embodiment, movement of physical object can also be incorporated into the game. For example, a dice 103 is equipped with a transmitted device, such as Bluetooth or other transmission protocols or methods. Once the dice lands, it transmits the value shown by the dice. The main board 102 includes a receiver that receives the transmission from the dice and uses the information to advance the game. A similar implementation may be made with, e.g., sand clock 107, game pieces, etc.

In an alternative embodiment, a role of a dice is implemented using transmission from the personal terminal 104 to the main board 102. In such an implementation, an accelerometer may be embedded within the personal terminal 104, so that when the user shakes the terminal it simulates shaking of the dice. Then, when a user makes a motion as if to "spill" the dice onto the main board game 102 (this can be sensed using, e.g., an inclinometer embedded in the terminal), the personal terminal 104 transmits to the main board 102 a transfer command that may include an identification of the dice, its speed of role, the strength of the user's motion, etc, whereby the personal terminal 104 shows a graphic of the dice falling off, while the main board 102 uses the data transmitted from the terminal 104 to show graphics of the dice rolling onto the main board 102 at the appropriate force and direction. The dice may also roll from one board to another, when more than one board are used for the main display.

In one example, when the main board is implemented as a television or remote monitor, the personal units operate in two modes: game mode and control mode. In game mode, the personal unit displays the personal screen of the game, and command entries of the user affect his/her personal terminal. For example, in card game the unit will display the personal cards of the player and the player may reorient the order of the cards shown on his/her personal display, add/remove cards from his/her personal display, etc. In control mode the unit is used to control the objects displayed on the main screen, e.g. to shuffle the card stack on the main board and distribute cards to the various players.

Each one of the game modules, i.e., main board 102 and personal terminals 104, communicates with the other modules using either wireless or wired communication or shared memory interface to exchange game related information, timing information, and control information.

The gaming system 100 may have a games repository (shown in FIG. 2), so that the same hardware can be used to play a variety of games. Games repository may be coupled to a web-based game repository 110 accessible via the Internet 108, allowing players to download games into the system. Games repository may also reside on local permanent storage media (e.g., a hard drive), or removable storage media (e.g., a CD, an SD memory card, a USB flash memory device etc.) configured to load games into the gaming system 100. The removable storage media insertion slot (shown as input slot 212 in FIG. 2) may be built into the board 102, or may be on an external work station 106 coupled to the board 102. Work station 106 may also serve as the gateway to the Internet connectivity for game download, if the board 102 itself is not Internet-enabled. Work station 106 may also serve as the platform for developing and testing new games, or adding/modifying several features of existing games, managing individual player profiles, etc. All the activities that require for the ongoing usage of the system including players management, users' favorites, handling terminals positioning and the merchandise of games content are available directly from the game board user interface.

The above configuration tasks are hidden during the game play and available through floating dashboard that can be launched anytime from pre defined key (e.g. <Esc>) or hot spot on the board (e.g. bottom left corner).

Figure 1B:
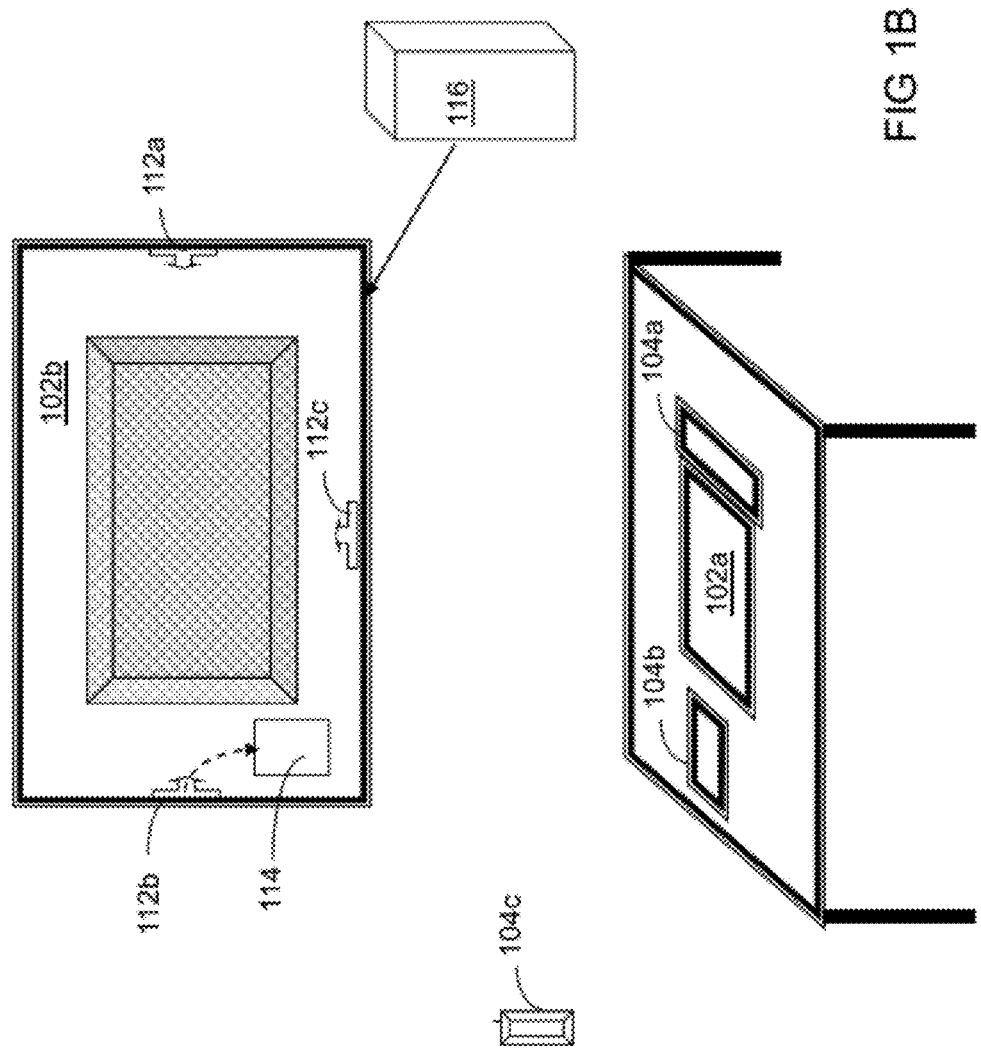
FIG. 1B illustrates components of an example game system with two main game boards (one on the table and one mounting to the wall) and multiple personal game terminals, according to an embodiment of the present invention.

For a further illustration, FIG. 1B depicts an example of a set-up wherein a first main board 102*a* is a dedicated hardware placed on a table, and a TV set 102*b* is used as the second main board. Two personal units are used in this example, unit 104*a* being a dedicated hardware—here attached to the main board 102*a* so as to receive power for charging its batteries—and unit 104*b* being a standard PDA, smartphone, etc., running the QS software and communicating with main board 102*a* wirelessly. Alternatively, the TV set may be connected to intelligent processing unit 116, which may be a pc, a media center, a game console, a set-top box, or embedded in the TV appliance. In such a case, the main board 102*a* function is replaced by the processing unit 116 running the QS software. The personal units 104 may communicate with the board processing unit 116 wirelessly.

System Initiation

When the game is initiated, for example, from main board 102*a*, the processor of main board 102*a* publishes/broadcasts its existence and activates its receiver to recognize any other main boards or personal units in its neighborhood. For example, in the embodiment of FIG. 1B, the main board recognizes the presence of the second main screen 102*b* and may prompt the users to select whether they wish to extend the main board display to unit 102*b*. If so, the processor may prompt the users or use internal rules to determine how to extend the main screen into unit 102b. That is, depending on the game selected by the users, unit 102b can be used to duplicate the screenshot of unit 102a, to extend part of the screenshot to unit 102b, to "smartly-duplicate" to unit 102b, etc. Conversely, the main board may receive requests form other main boards to serve as a secondary board. Upon receiving such a request the main board may prompt the user for approval. The main board also loads the game from local or remote sources.

Figure 1C:
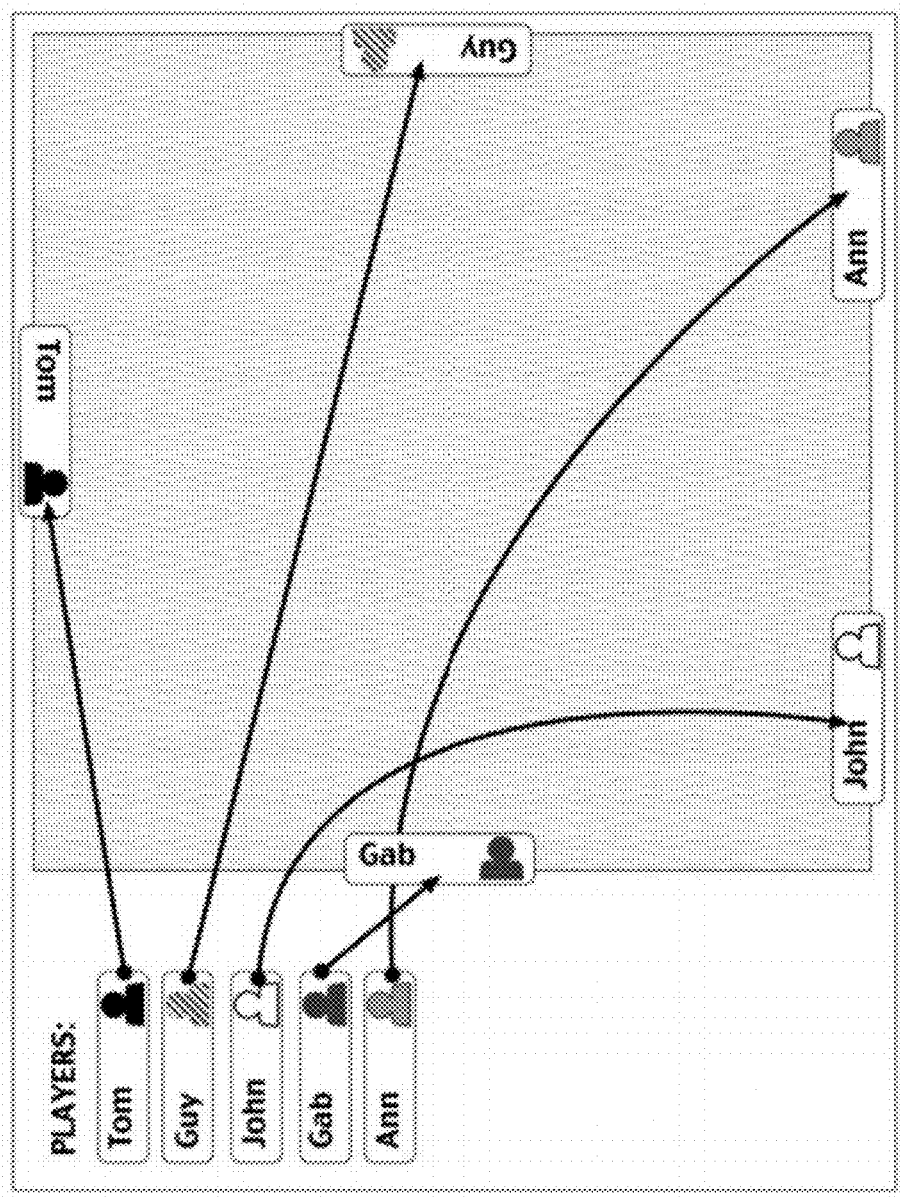
FIGS. 1C-1E illustrate the player positioning feature according to embodiments of the invention.
Figure 1D:
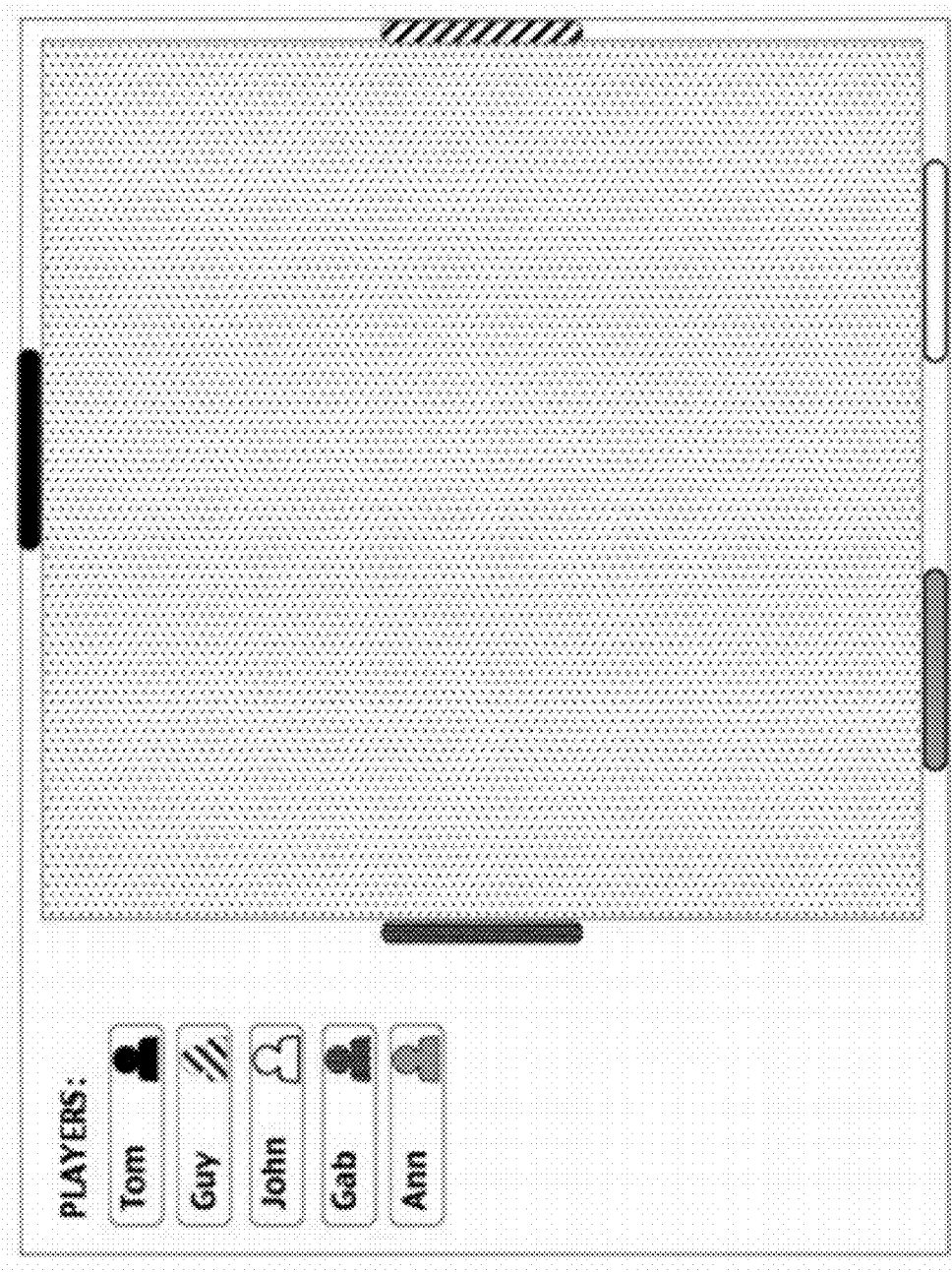
Figure 1E:
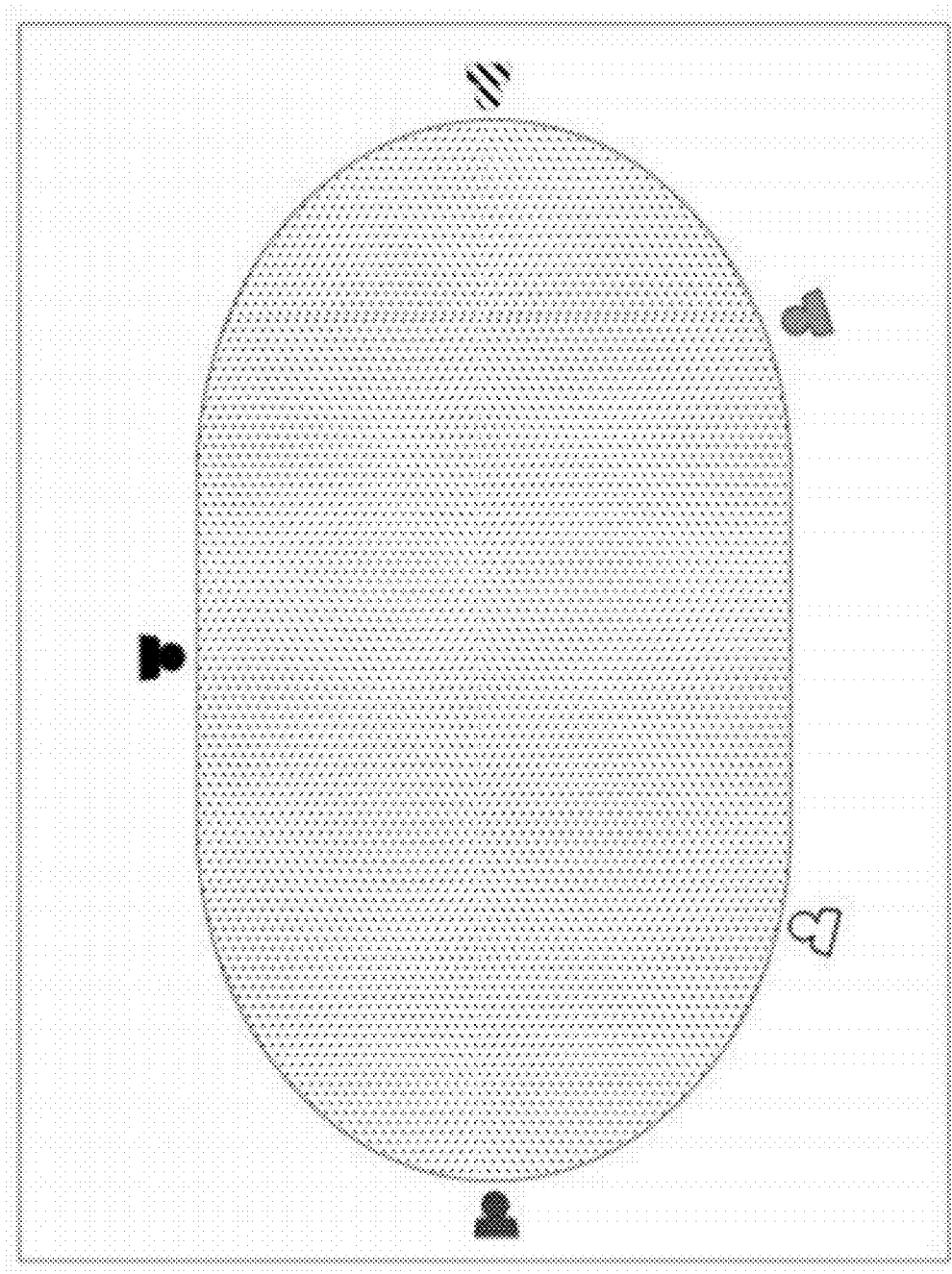

When the main processor detects that wired unit 104a is connected to the main board 102a, it may prompt the user whether to accept the unit 104a as a player. If so, the main processor may display a gate or other graphical indication 112a associated with unit 104a. If the location of graphics 112a does not correspond to the physical layout of the players with respect to main board 102a, the users may "drag" the gate to a different location on the main boards 102a and 102b. FIGS. 1C-1E illustrate the player positioning feature according to embodiments of the invention. The "Board subsystem" manages the players' position on the board. The process may start with the collection of players with terminals or the definition of current players on the board (e.g. in case of Chess the terminal is not mandatory). Players positioning view shows a "symbol" for each player and let the users drag their symbols to their preferred side on the board. The process supports any number of players that can share the same side. For example, in FIG. 1C five players participate in the game, and each is depicted using a defined player's name and an image, which may be, e.g., a player's picture, an avatar, etc. In FIG. 1D, each player is assigned a different color, so that they can e differentiated. FIG. 1E shows each player using a colored or shaded image. The above process may also define the area in which the player objects will be exchanged with the board, e.g. when he/she drop tiles from his terminal to the board, or drags cards from the board to his terminal.

In many games, the "Board subsystem" manages the turn of the players. When the turn is well defined, multiple players can share the entire side for drag-and-drop actions (vs. the case of using fraction of the side depends on the number of players).

The above process may be performed before any game starts and can be altered during the game. The defined positions and drag-and-drop areas may be viewed during the game as names, colors, avatars, and/or players pictures as additional "players' layer" on top of the board area, as exemplified in FIGS. 1C-1E.

In some games, when it's important that all players will know each other assets/status (e.g. chips in Poker, cash in Monopoly, or score in many games), the "players' layer" may show in addition to their names, colors etc., their assets/status.

Alternatively, the above players' details can be defined as "players' box" that can be dragged to any area in the board and thereafter used as the players' "gate" to the board (e.g. in Poker it makes more sense to position the "players' box" adjacent to the table vs. the frame of the display, as illustrated in FIG. 1E). If the personal units are wireless, e.g., unit 104b is wireless, they attempt to detect the main board and request to join its space, if approved, the same positioning process apply.

If the personal units are hosted on smart devices, it's the QS software role to follow the same protocol, e.g. discover the board, request to join, and participate in the positioning process. It should be noted that this "discovery and acceptance" process is especially important in locations where many main boards are operating, such as in video arcades, etc. In such situations, many smart devices may try to communicate with many available main boards. In order to ensure that communication from each personal unit is directed to the proper main board, the unit must be "discovered and approved" by the main board. Once approval is granted, the personal unit can participate in a game on that accepting board, and communications from that personal unit will not affect any other main boards in the neighborhood. Additionally, during the discovery process, various actions germane to the game being played may be executed. For example, if the main board determines that the particular personal unit has already participated in this game in the past, it may interrogate the unit or its own memory for assets remaining (e.g., weapons, lives, etc.) from the previous game and make a note of the list of assets and may send an update to the terminal unit. Conversely, if the unit has not previously participated, the main board may issue initial set of assets to the unit.

Figure 1F:
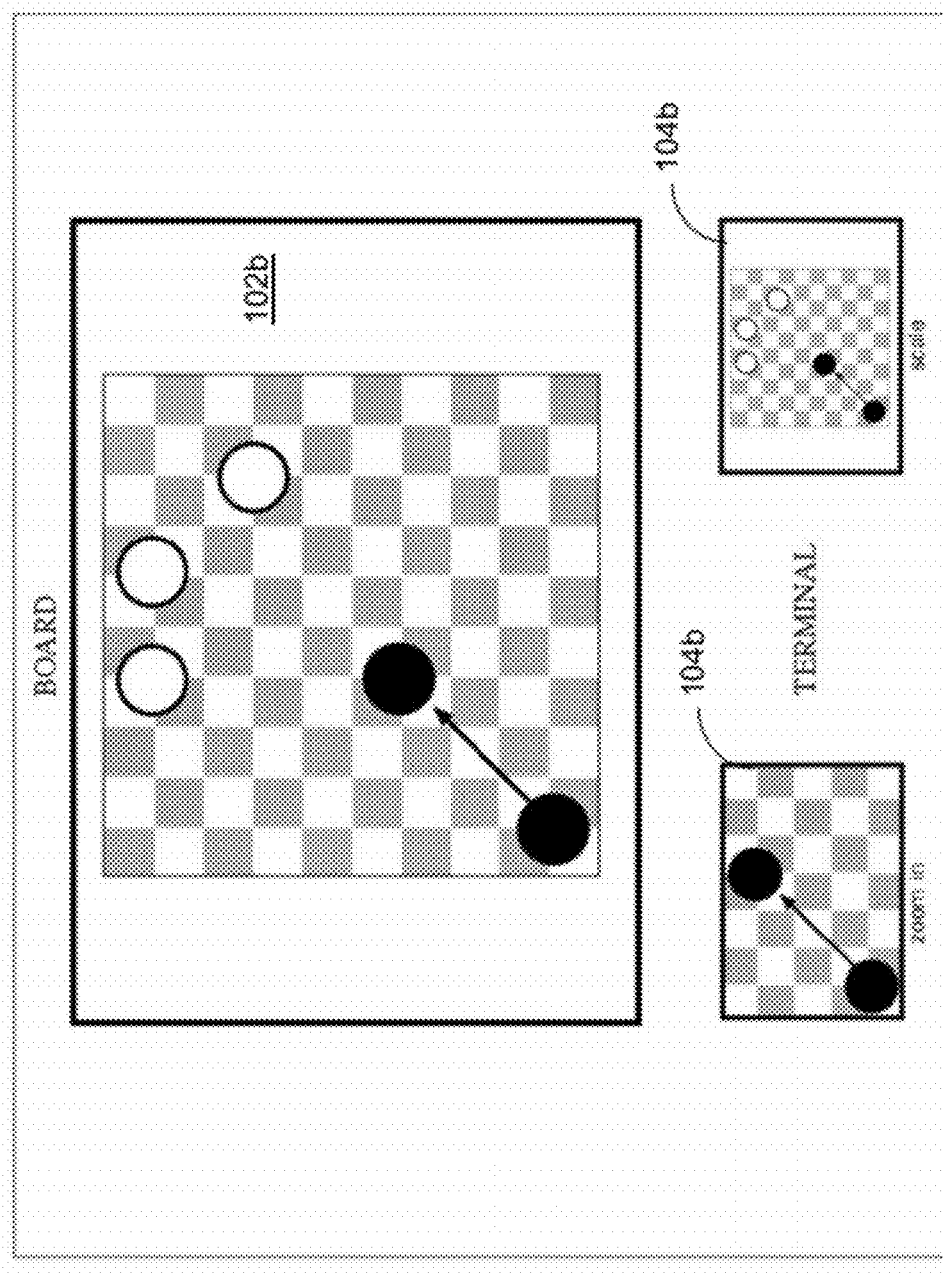
FIG. 1F illustrates a control mode feature of the personal terminal unit.

Once communication is established and a personal unit is accepted to the game, the user can utilize the personal unit to control his/her actions in the game, as described more fully below. Additionally, when the game board is displayed on the TV monitor 102b, and a user wishes to take an action on that board, e.g., move a game piece, it may be inconvenient to require the user to get up and walk to the TV, or using the TV remote control to perform the action. If the main board displayed on 102b is a duplicate of what is displayed on 102a, then the user may simply drag the game piece on board 102a. However, if it is not duplicate, then according to a feature of the invention, the user may switch his/her personal unit to operate in a control mode, wherein action on the personal units affect the TV monitor 102b. This feature is illustrated in FIG. 1F. To help the user, the display of the TV monitor 102b may be replicated on his personal terminal unit 104b. Additionally, the user may be able to "zoom in" on selected areas of the TV monitor that is displayed on his/her personal unit (shown in the left-hand zoom-in drawing), so as to make it easier to select a game piece. In this mode the personal unit may also function as a wireless mouse or other such wireless input device. When the user returns the personal unit to terminal mode, action on his/her personal unit affects the game in the normal manner as described herein.

When a personal unit has been accepted to the game and has communication channel established with the main board, it may request from the main board a list of all other connected personal units and their relevant data. It may also be used to communicate directly with other connected or unconnected personal units, for example to exchange game pieces, to share views, etc. If a communication is established with a personal unit that is not connected to the game/main board, the personal unit may send an invitation to the non-connected unit to join the game.

According to aspects of the invention, game pieces are moved seamlessly between each personal unit and the main boards, and optionally between two or more personal units. When such an action takes place, transfer rules are implemented. The rules may include instructions regarding the display of the transferred piece, instructions regarding actions to be taken upon transfer of the piece, etc. For example, when moving a card from unit 104b to main board 102b, the rules may include displaying animation on unit 102b, showing the card entering from gate 112b and moving to stack 114, as illustrate by the broken-line arrow in FIG. 1B. The action to be performed may include sounding an audio clip, playing a video clip, issuing another card from the stack, calculating score, etc.

According to another feature of the invention, main board 102a also serves as a charging hub. That is, when personal units 104 operate on rechargeable batteries, charging several units would requires the same number of wall outlets or a multi-outlet cable. Instead, according to a feature of the invention, main unit 102a includes a charging controller coupled to several outlets, so that each personal unit 104 may be connected to the main unit 102a for charging.

Working Modes for the Gaming System

The gaming system may support different working modes, controlled by the game's underlying software, as will be described below. Some example working modes are discussed here.

Single Board Mode

In this mode only one main game display unit comprises the game board 102, and is used to display game layout and to receive player input.

Master-Dumb Mode

In this mode more than one display units comprise a game board 102. Each display unit displays a portion of the game layout and provides input means with respective touch panels. A main display unit is fully equipped with a full set of controls. The other display units may also be fully equipped with controls, or include only respective display screen and touch screen modules. The other display units are physically connected to the main display unit and serve only as display extension, where the main display unit supplies both power and display distribution data.

Master-Slave Mode

In this mode more than one display units comprise a game board 102 and all the display units are fully equipped with controls. One of the display units is assigned to serve as the "master" and the other display units are assigned as slaves. The roles for each display unit are automatically negotiated between the units themselves and are confirmed by each unit. The participating units are coupled to each other in two-dimension forming a large display structure and communicate with each other in order to exchange control and application related information.

Distributed Software Engine

Figure 2:
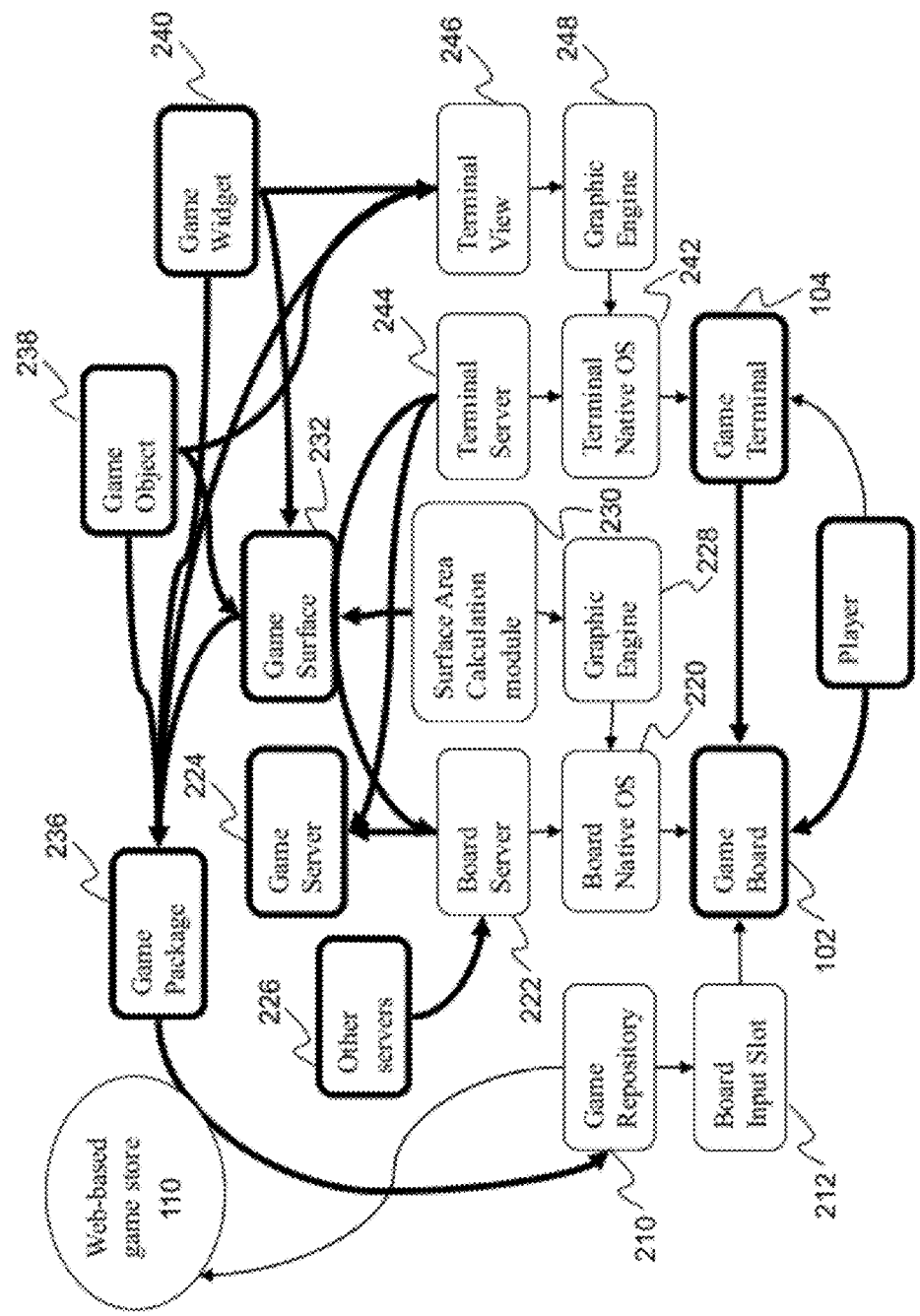
FIG. 2 illustrates interrelationship between various hardware and software components of a game system, according to an embodiment of the present invention.

The gaming system according to embodiments of the present invention is powered by a software engine distributed across the system hardware components, such as, the components shown in FIG. 2. The distributed software engine comprises several software packages, each of which handles different levels of the system, including the game board(s) and terminals, the game development environment and the web services.

Figure 1G:
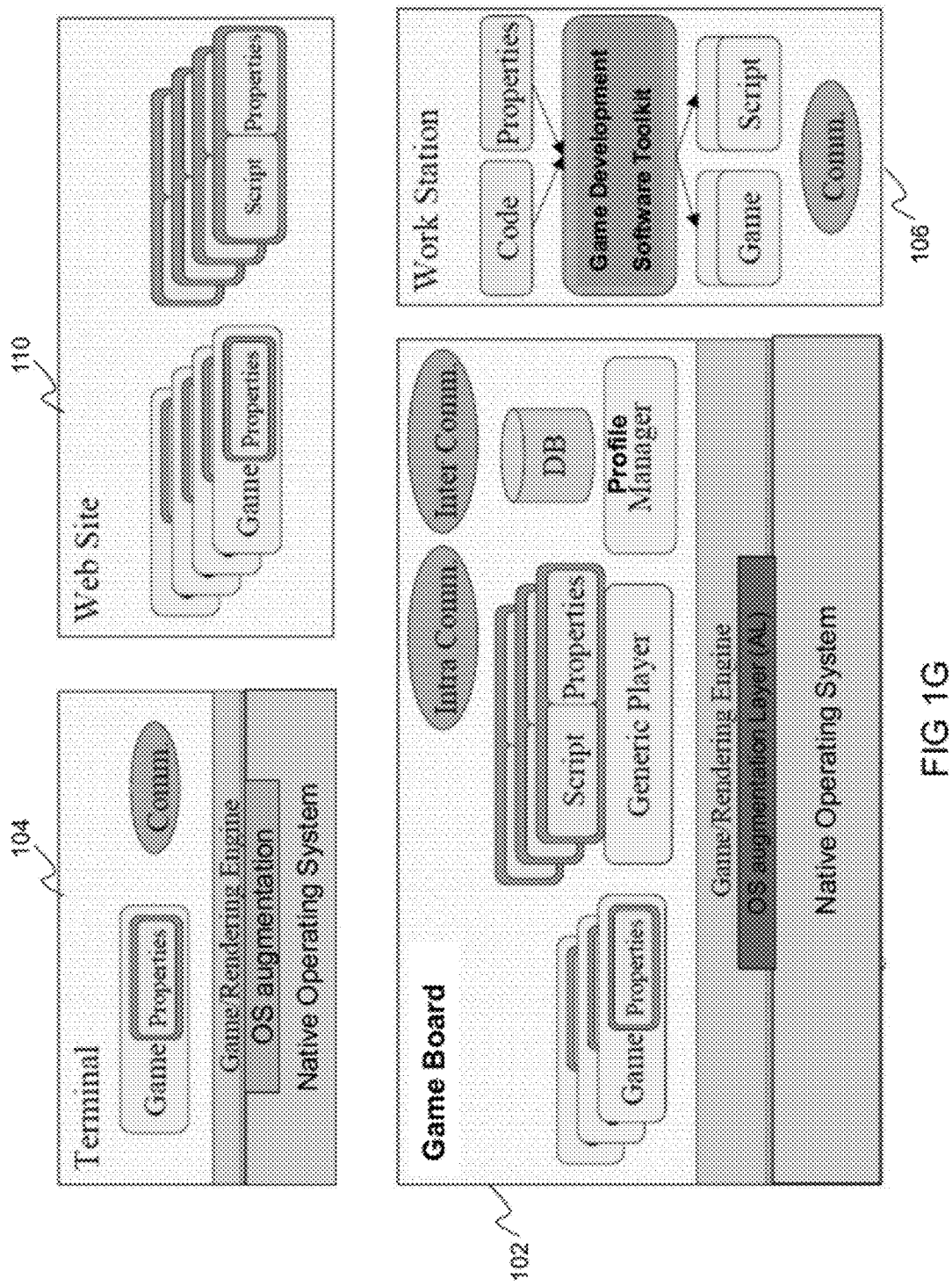
FIG. 1G illustrates a high-level schematic representation of a distributed software engine enabling the digital board games, according to an embodiment of the present invention.

FIG. 1G shows a high-level schematic representation of the distributed software engine, where the software engine components are distributed between the game board 102, terminal 104, web-based game repository 110, and work station 106. Persons skilled in the art will appreciate that the distributed software engine automatically controls many of the features of the gaming system, while letting some other features (related to a specific game or a specific player profile) to be customized by the players so that they can enjoy a rich user-experience while playing (e.g. personalizing the pictures in the Memory game).

Customization can be done at the web-based game repository 110, at the work station 106 (by the game developers), or locally at the game board 102, as shown in FIG. 1G. Players have the option to use predetermined game properties loaded as default options at the board 102, at the game terminal 104, at the work station 106, and at the web-based game repository 110, or customize the properties according to their preference. Some of the game properties may not be changed, for example, some fixed game rules are recommended to be left intact. Work station 106 may be used by game developers for creating new games or new features of an existing game using a game development software toolkit. Proprietary or standard communication protocols (indicated by the "comm." functional blocks in the work station 106, game board 102, and game terminal 104) are used between gaming system components to exchange game-related information. Game board 102 may have intra-module communication protocol to identify and communicate with multiple display units in one main game board or multiple main game boards, and inter-module communication protocol for identifying and communicating with game terminals 104.

A game board 102 may offer a generic player profile to the players, which can be customized by the players using profile manager software module, and the customized profile is saved in persistent database DB.

The web-based game repository 110 may provide various customer service options, such as, game download support (from server or from users using peer-to-peer services), subscription and billing management, new feature suggestion, user feedback collection, etc.

System and Application Software Packages

The two main software packages included in the distributed software engine are: the "System" package, which handles the platform dependent functionality, and the "Application" package, that handles the game related activities. The System package is responsible for managing and controlling different hardware elements (e.g., game-boards 102 and game-terminals 104) and their communication, and is responsible to provide all the services required by the Application package to execute and control any desired game independently of the actual hardware setup.

System Software Package

The system package of the distributed software engine may interpose an intermediate augmentation layer to work with an existing native operating system on various system components, so as to create an application-specific environment. Alternatively, the distributed software engine may also include a full-fledged stand-alone application-specific operating system, rather than interposing an intermediate augmentation layer coupling an application layer with a native operating system. When the system package is in the form of an augmentation layer, it provides two essential services: i. translating controls between the application software and the native OS, and ii. providing game-related services not provided by the native OS. Providing the translation services by the augmentation layer provides game developers with the freedom to develop games without regards to the OS the game will be played upon. It also enables playing a game with several units, each running a different native OS. The function of providing game-related services makes it easier for game developers to develop games by simply inserting calls to the augmentation layer when needing a service. For example, the augmentation layer may provide services such as, rolling a dice, shuffling a deck of cards (e.g., using random number generator), generating hectic sensation (e.g., by activating vibration in the handheld unit), etc.

The system package associated with the board 102 is referred to as a game board system package. The game board system package is responsible for identifying the working mode of the game, examples of which are discussed above. Upon game initialization, the main display unit of the game board 102 looks for the presence of other display units. As long as no additional display unit is detected, the board 102's working mode remains "Single-Board mode". In this mode, the board 102's CPU (central processing unit) sends all the display information to its screen. In case another display unit was physically detected, the main display unit validates the other unit characteristics over the physical connection and moves to "Master-Dumb mode" or "Master-Slave mode" accordingly. In case of "Master-Slave" mode, all the display units negotiate in order to determine which board is taking the Master role.

In addition to communicating between the video controllers of the various display units to display the game surface properly, player input is also managed by the board system package according to the working mode. In Single Board working mode, the only source for player input is the board's touch panel or key pad (or trackball, joystick, buttons, etc.) going to the board's CPU. In Master-Dumb mode, both the master and dumb touch panels or key pads (or alternative tracking mechanisms) are connected to the main board CPU which identifies the input source and translates its position in reference with the entire displayed area. In Master-Slave mode, each board's CPU receives the player input from its own touch panel. Once received, each CPU immediately sends the input information to the other boards through the communication channel. In this mode, each CPU works independently and acts as if it is the one entity that manages the whole application (i.e. the application/game is simultaneously being executed on each one of the connected boards) but displays only the portion assigned previously by the master board.

Game board system package also handles low-level communication between the main game-board and the game-terminals by implementing a data transfer protocol to be used by the application package. The Game board system package also may establish communication with web-based game repository, for example Q-store by Quado Media.

The system package associated with the game terminal 104 is referred to as a game terminal system package. The game terminal system package is responsible for the display management in the terminals 104, player input management in the terminal 104, and the low-level communication between the terminals 104 and the game board 102 by implementing a data transfer protocol to be used by the application package.

Application Software Package

The Application software package is responsible of handling the interaction with the players and any related game functionalities. The package includes a 2D and/or 3D graphic engine and the implementation of different board games for the game platform.

The game board application package initializes the application software modules, and displays the main menu (home page) allowing a player to select any available game or sub-menu. Once a game is selected, the game board application package loads and displays the game layout and all the relevant game objects. The player may, by means of fingers gestures over the touch-screen, or pressing keys, or moving a joystick, move any game objects and position them in any desired location. Some game objects, upon movement and interaction with other game objects, may be configured to launch a set of pre-defined animation video clips and sounds. A game object may be moved by the player from the game-board 102 screen to be displayed on a game-terminal 104 screen and from the game-terminal 104 screen to the game-board 102 screen.

The application package uses the communication services that are provided by the system package to exchange game objects between the terminals 104 and the boards 102 as well as for sending game-related control messages.

Other functionalities controlled by the application software may include displaying the game instructions upon player request (e.g., when the player accesses the Help menu), saving game status for restoring session in future, indicating playing turns in a multi-player game, adding/removing players, changing game levels, adjusting audio and/or display, changing game skin, etc. In case a removable storage media is inserted, the application software may automatically launch the game stored on the storage media, or a game menu to choose from.

The game terminal application package initializes all the application software modules, and manages seamless visual transition of game objects between the game terminals and the main game board screen. In addition, the terminal application package displays game related controls and information, such as, the player's points or status. The application uses the communication protocols that are provided by the system package to exchange signals for transitioning game objects between the game terminals and the game boards as well as for sending game-related control messages.

Components of Distributed Software Engine

FIG. 2 shows a high-level representation of some of the components of an example distributed software engine with respect to the hardware components of the gaming system and associated functionalities in one embodiment. The broad purpose of the distributed software engine is to enable one or more players to play games interactively. Players interact with the game board 102 (which may also be an existing appliance with a display, such as a TV, a computer, a tablet PC, etc., running corresponding parts of the distributed software engine.). Each player may have a corresponding personal game terminal 104 (which may also be a cell phone, a PDA, a remote control device, a game console etc., running corresponding parts of the distributed software engine as discussed before). One of the tasks of the distributed software engine is to manage the players' profile for a specific game or a host of games supported by the gaming system. Another task is to enable seamless transfer of digital game pieces between and among the terminals and the board or boards.

In FIG. 2, the thick arrows indicate many to one communication, and the thin arrows indicate one to one communication.

The game board 102 displays the shared public region of the game surface 232. Game board 102 may have an input slot 212, through which a specific game is loaded from a game repository 210. Game repository 210 may be configured to download games from a web-based game store 110, as discussed with respect to FIG. 1A, or it could be local.

Game board 102 may or may not have a native operating system 220 (such as, Linux or Windows XP etc.). If a native operating system 220 exists in the board 102, then the distributed software engine's augmentation layer comes into play to associate application-specific software components with the board's native operating system 220. A portion of the distributed software engine associated with the board 102 controls the functions of a graphic engine 228. Graphic engine 228 is configured to control the display of a game surface 232, either spread across several display units constituting the board 102, or displayed on just a single display unit constituting the board 102. Graphic engine 228 may or may not dynamically change orientation of the game surface 232 based on player's viewing preference (which may be linked with the player's sitting position). Graphic engine 228 may also launch a game's fundamental layout, and starting position, e.g., laying out the grid in a Scrabble game, and organizing the cards in the players hand in card games.

Board server 222 is the "brain" of the distributed software engine for the board 102. Note that the word "server" encompasses both the hardware and the software associated with performing a specific function of the gaming system. However, in the context of the description of the distributed software engine, the term "server" is used primarily to mean the software component. Board server 222 is implemented on top of an existing native operating system 220, or board server 222 may include an application-specific operating system. The board server 222 detects and registers itself on the local network, communicates with other distributed software engine components, schedule games and manage licensing and caching functions of various games.

Board server 222 may implement other servers 226 for specific purposes. For example, a communication server may handle the communication and negotiation between various software engine servers (such as the board server 222 and a terminal server 244), a cache server may handle the caching of games content, a licensing server may enforce the games licensing policy, and so on.

Game server 224 is the active game "brain" that is spawned by the board server 222 when the players select a new game to start. Game server 224 records and updates the game status (e.g., maintains a list of current players, each player's scores etc.), manages the game flow, communicates with the game repository 210 for additional game-related information, and communicates with other servers (e.g. cache management communication with a cache server).

Game package 236 includes the code, graphical objects, logic, and essential licensing information that the distributed software engine understands and executes. Game packages 236 are available at the game repository 110 on the web, or on removable storage device that can be inserted or plugged in to the board 102. Game package may also be loaded in the local hard drive of the game board 102. Game package 236 is the part of the distributed software associated with the hardware described as the game repository 210.

Game surface 232 is the graphic layout of the game. The game surface 232 can be defined on a single board 102 (with one or more display units), or on multiple boards 102 (each board 102 having one or more display units). The equivalent of game surface 232 that is extended to terminals 104 is called a terminal view 246. Game widgets 240 and game objects 238 associated with the game are moved between different portions of the game surface 232 (and the terminal view 246) displayed on different modules. A component of game surface 232 is a surface area calculation engine 230, which computes which portion of the game surface 232 is going to be rendered on which display unit, in the case of a multi-unit game board 102.

A portion of the distributed software engine, called a terminal server 244, resides on each terminal 104, and helps associate individual players to corresponding terminals 104. It may be possible to accept/reject players or terminals on the fly during an active game, and to associate players' or terminals' positions around the board 102. Terminal server 244 is the "brain" on the corresponding terminal 104. Terminal server 244 is typically implemented on top of the terminal's native operating system 242. For example, a dedicated game terminal may have a Linux-based application-specific native operating system. On the other hand, a smart phone used as a terminal 104, such as an iPhone, may have a native operating system (e.g., OSX) installed in it. Terminal server 244 acts as an application server that communicates with the native operating system 242 via an intermediate augmentation layer. Terminal server 244 communicates with the board server 222 and the game server 224 and manages player interaction.

A graphic engine 248 for the terminal 104 interacts with terminal native operating system 242 (possibly via the augmentation layer), and controls terminal view 246, i.e. the portion of the game surface 232 that is displayed on the terminal 104. Terminal view 246 usually includes a few game widgets 240, game objects 238, and other utilities that are used by individual players during the game play.

Game widgets 240 are special digital widget that are necessary for particular games. Examples of game widgets 240 are Scrabble bag, dictionary, dice tray, etc. Game widgets 240 have special function in the game flow and usually special location on the game surface 232 and/or terminal view 246.

Game objects 238 comprise movable objects of the game, such as, tiles, cards, tokens, etc. Game objects 238 have a starting location on the game surface 232 or terminal view 246, and associated moving rules, visual rules, impact rules, etc. Players typically move game objects 238 on the game surface 232 and to/from the terminal view 246. The movement of game object 246 is seamless. For example, as soon as a game object 238 is 'dragged' out of a terminal view 246, it appears on the game surface 232 on the game board 102, so that a player can continue to use the same game object 238 on the game surface 232.

Physical Components of an Example Gaming System

Figure 3:
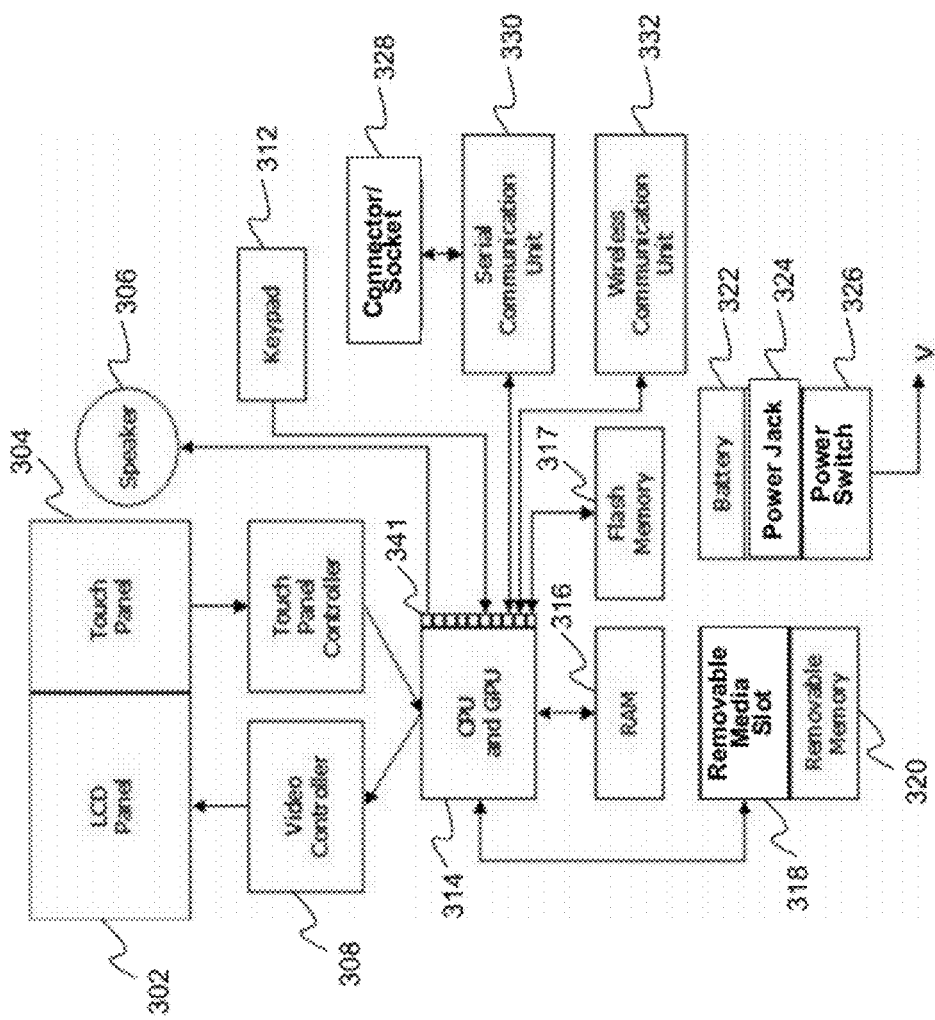
FIG. 3 illustrates a schematic diagram of some of the hardware components of a main game board, according to an embodiment of the present invention.

The gaming system according to one embodiment of the present invention comprises a main digital game board 102 and one or more game terminals 104. The game board 102 acts as the shared public playing surface of the board game. As shown in FIG. 3, game board 102 comprises a display screen 302 (e. g., TFT-LCD panel, Organic light emitting diode (OLED) display or electronic paper or any other type of flat-panel display) for displaying a game board layout, and different game objects and graphic elements. A touch panel 304 may cover all or most of the display screen 302's surface, providing input means to the players. Other components of the game board include a speaker 306, a keypad 312, a video controller unit 308, a touch panel controller 310, a central processing unit 314 (which may include a graphic processing unit GPU), random access memory (RAM) 316, flash memory 317, a removable media/memory insertion slot 318 (e.g., a SD card socket), removable memory 320, a battery pack 322, a power jack 324, a power switch 326, a wireless communication unit 332, a wired communication unit 330, one or more magnetic and/or mechanical connectors/sockets 328 (to couple one board unit with other similar units, and to connect game terminals 104), etc. Other optional/additional components not specifically shown in FIG. 3 may include a microphone (for voice recognition interface), a vibrator for associating haptic feedback with the touch panel 304, etc. Persons skilled in the art will recognize that not all of the above components are necessary in all embodiments, and there may be additional components in certain embodiments, but the scope of the invention is not limited by the cited example components.

The game board battery pack 322 may comprise non-rechargeable use-and-throw batteries or may be configured to be charged from an external power supply unit, which is connected to the electricity outlet via power jack 324.

Figure 3A:
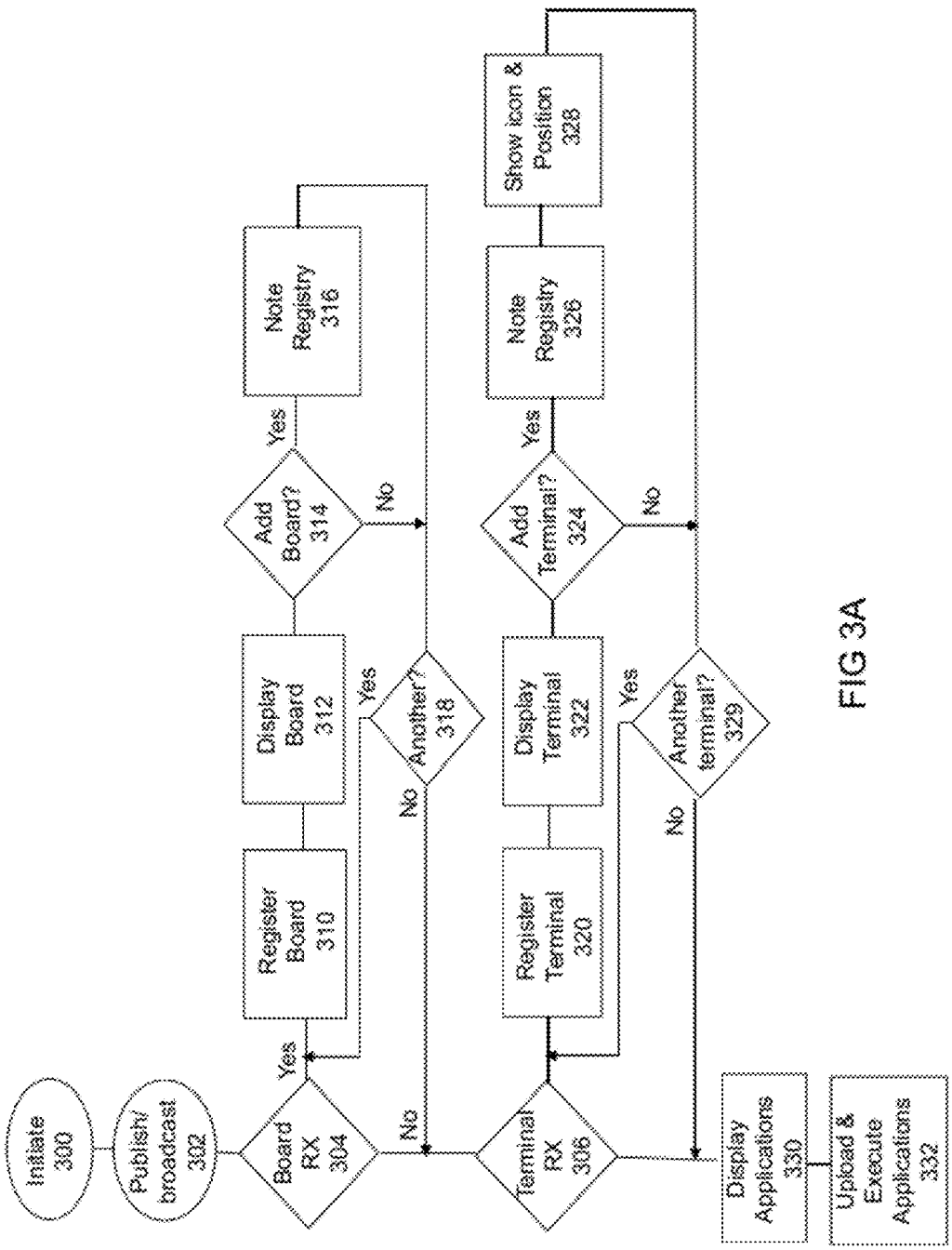
FIG. 3A illustrates an example of a process executed by the CPU.

The game application runs on the CPU 314 via the OS and augmentation layer, so as to make the CPU 314 execute various operations in conjunction with the other elements of the board. The communication may be made over a bus 341, such that the CPU can send or receive communication from connection sockets, wireless and wired units 328, 330 and 332, receive input from the keypad 312, and send sounds to the speaker 306, etc. FIG. 3A illustrates an example of a process executed by the CPU 314 for initiating a game session. The process initiates at Step 300 and at Step 302 the CPU publishes its existence by, for example, broadcasting a signal over the wireless unit 332. At Step 304 the board checks whether the wireless unit 332 received any communication from another board and, if so, it continues to subroutine at Step 310 by registering the properties of the second board in its memory, e.g., RAM 316. At Step 312 the board displays the properties of the second board on the display 302 and query the user whether to add the second board to the session. If at Step 314 the user indicates to include the second board in the session, the CPU updates a registry at Step 316 to indicate that game applications can be displayed using both boards. At Step 318 the CPU checks to see whether another board is available to join and, if so, reverts to Step 310. Otherwise, it continues to Step 306, where it checks whether any terminals have transmitted a request to join the session. If so, it executes a subroutine starting at Step 320 where the CPU registers the terminal's properties in its memory, e.g., RAM 316. At Step 322 the board displays the properties of the terminal on the display 302 and query the user whether to add the terminal to the session. If at Step 324 the user indicates to include the terminal in the session, the CPU updates a registry at Step 326 to indicate that the terminal may participate in the session. At Step 328 the CPU displays an icon (e.g., digital game piece, avatar, etc.) corresponding to the terminal and shows its position on the board (as noted elsewhere, the position may be changed by the user, and this can be handled using an interrupt subroutine). At step 329 the CPU checks to see whether another terminal is available to join and, if so, reverts to Step 320. Otherwise, it continues to Step 330 and displays the game applications available. Once a user selects a game form the displayed application, the CPU uploads and executes the game application at Step 332.

Figure 4:
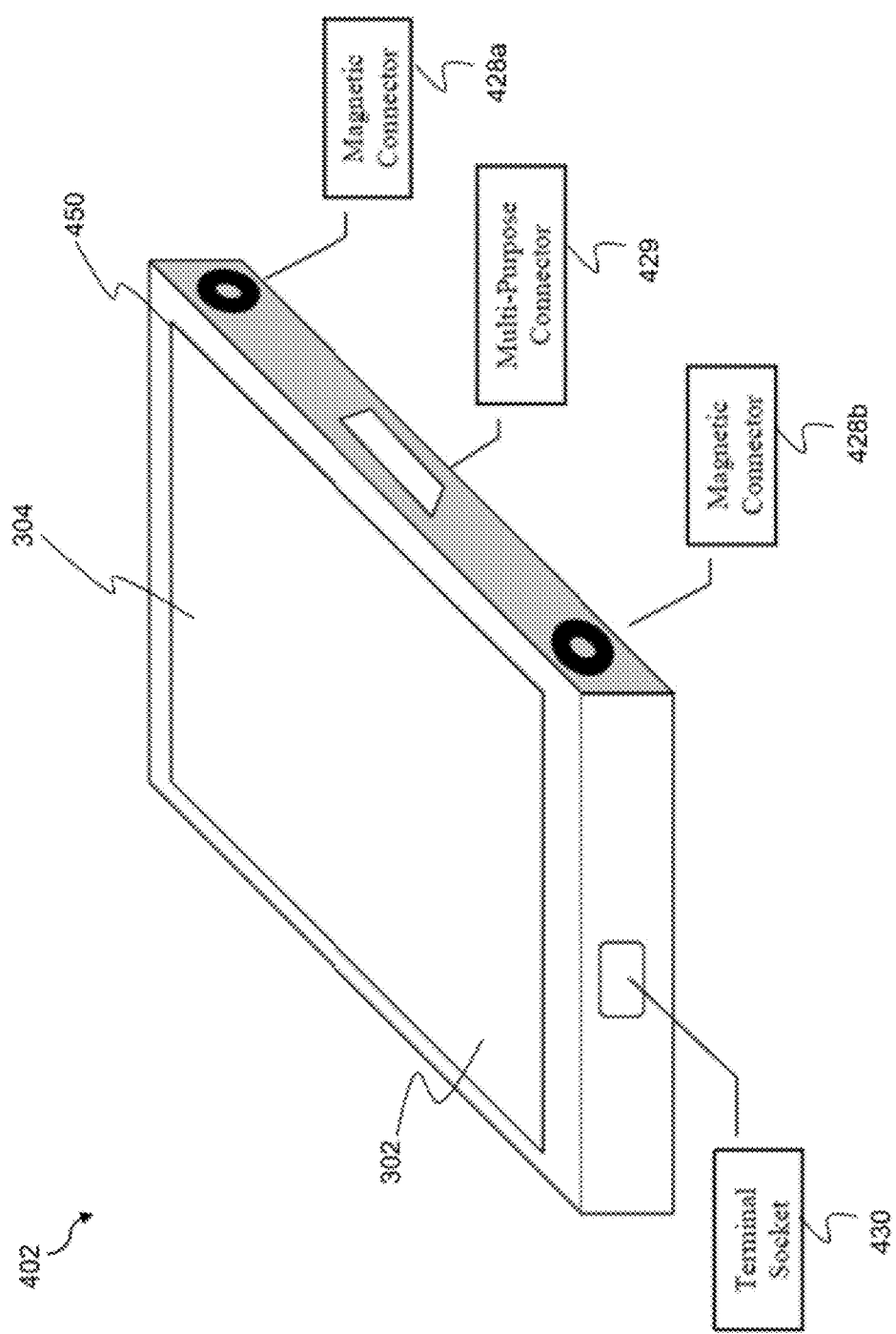
Figure 9:
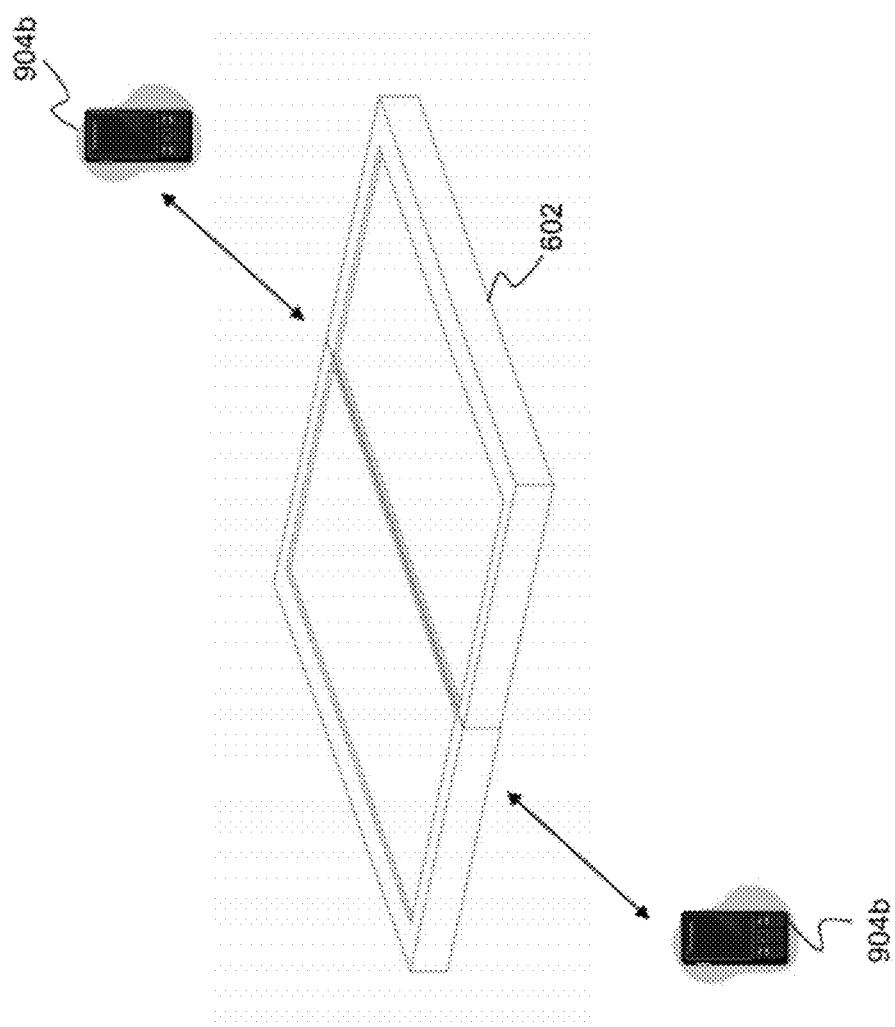
FIG. 9 illustrates an example gaming system where a main multi-unit game board communicates with a plurality of mobile devices, according to an embodiment of the present invention.

A single display unit 402 of game board 102, as seen externally, is shown in FIG. 4, showing a display screen 302 and a touch panel 304 encased in a housing 450. Housing 450 may be metallic or made of plastic or other materials. In this example embodiment, one or more sockets 430 located on the side(s) of the rectangular housing are used to connect the game board 102 to corresponding game terminals 104 (not shown) using specific cables. The connecting cables may feed power to the terminals 104 from the board 102's power supply, if the terminals don't have their own power source or for charging the terminal's batteries. The connecting cables may also serve as communication link for transferring game-related information between the game board 102 and the terminals 104. The cables may be connected to the board and the terminal using quick-release magnetic connectors or other type of fastening mechanisms. Alternatively, game terminals 104 (or other devices used as game terminals) may be wirelessly coupled to the game board 102, as shown in FIG. 9.

Additional game-board display units can be optionally attached to the display unit 402. The units 402 may be identical to each other, or may be an extension game board display unit which is driven by a main game board display unit, which serves as the 'master'. An extension game board display unit may only have a subset of hardware components, such as an LCD display screen, a touch panel, and a video controller. For attaching one game board display unit 402 with another, one or more magnetic connectors 428a-b are provided on at least one side of the housing 450. Other types of connectors may be used too. Magnetic connectors 428a-b are designed for firm attachment with another similar unit 402. A power connector may be embedded within the magnetic connectors 428a-b or is otherwise formed (e.g., embedded within a multi-purpose connector 429) to enable power-sharing between display units 402, or to enable feeding power from a master unit to an extension game board display unit.

The multi-purpose connector 429 is located for establishing communication (and/or power) link between two or more display units 402. Inter-unit communication includes sharing touch panel input, multi-screen display sharing information, seamless game object movement, routing of terminal communication received by an extension game board display unit to the master unit's CPU, clock synchronization signal etc.

FIG. 5 shows an embodiment, where transfer of electronic signal between two game board display units 502 are carried out through a pin array 530 (magnified view shown in insert) embedded within the magnetic connectors 528a-b. Display unit 502 is very similar to display unit 402 with a few exceptions. The magnetic connectors 528a-b facilitate in establishing reliable contact between pin arrays 530 of two game board display units by securing proper alignment and firm attachment. In the embodiment shown in FIG. 5, multi-purpose connector 429 may be redundant. Also, display units 502 may have externally hidden wireless communication ports for communicating with game terminals.

FIG. 6A shows how two display units 502a-b are aligned side by side before attachment, and FIG. 6B shows how a unified dual-screen game board 602 is formed after the units 502a-b are combined.

Figure 7A:
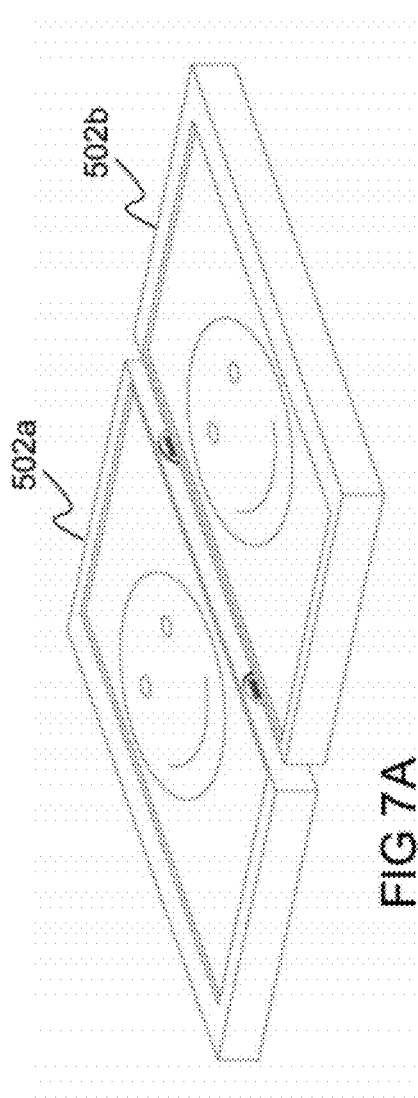
Figure 7B:
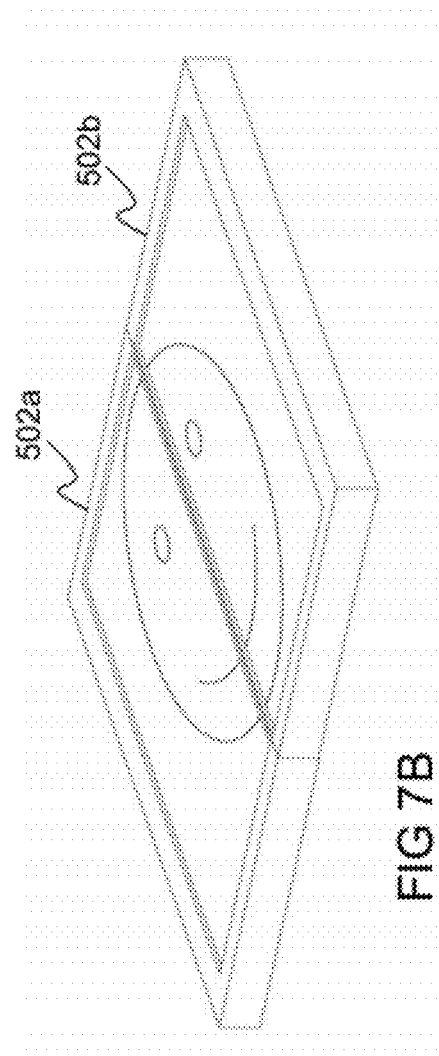

FIG. 7A shows that players have the option to keep two display units 502a and 502b separate, each displaying the same game layout, symbolically indicated by the smiley faces. Another option is to spread the game layout between two screens, as shown in FIG. 7B. As the display units 502a and 502b are attached to each other, the system automatically spread the game layout among multiple screens.

FIG. 7C illustrates an embodiment of the game wherein the main board 102 includes facility to contain the terminals 104a-104d. In FIG. 7C terminals 104a and 104b are illustrated fully deployed and positioned for playing. On the other hand, terminal 7c is illustrated partially deployed from the "docking" position in the main board, while terminal 104d is illustrated fully docked to the main board 102.

Figure 8:
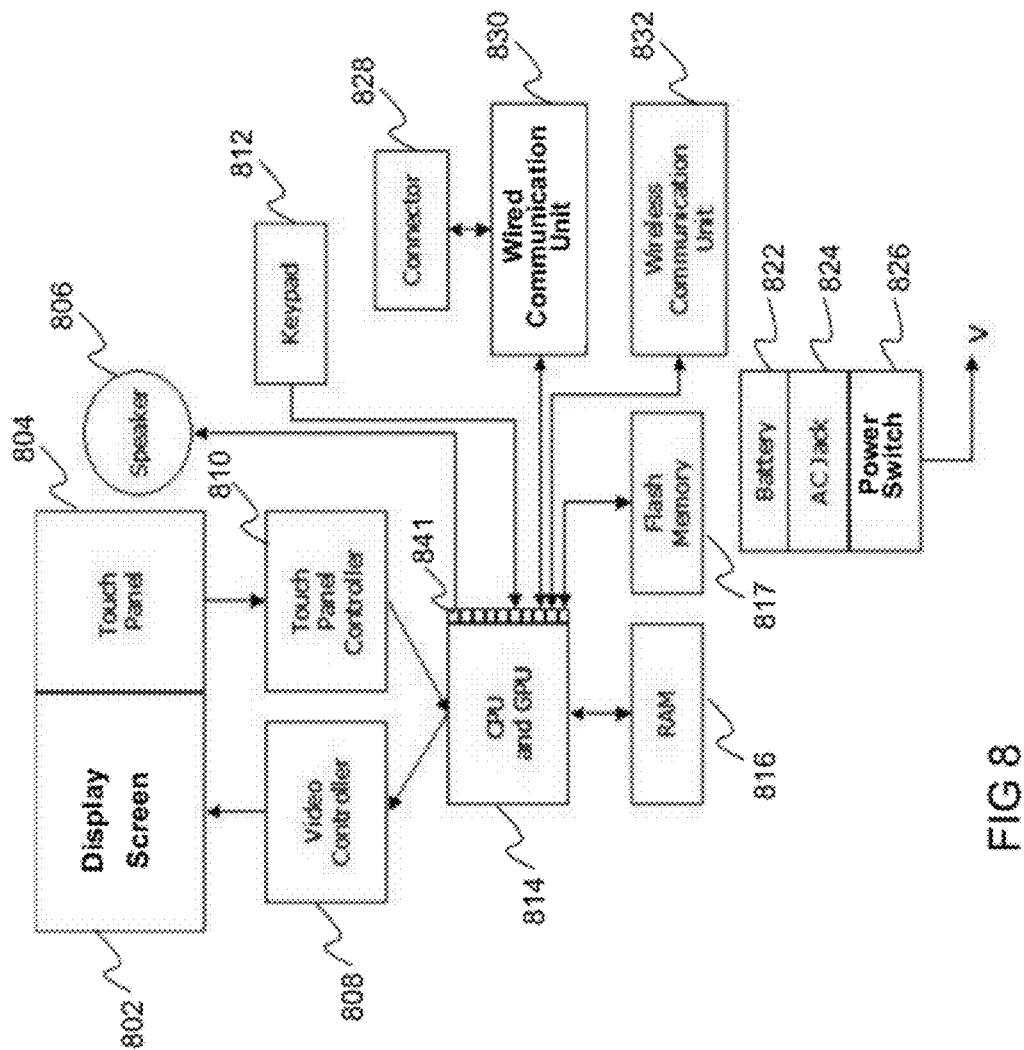
FIG. 8 illustrates a schematic diagram of some of the hardware components of a game terminal, according to an embodiment of the present invention.

The game terminal 104, shown in FIG. 8, may be a handheld device, which acts as a player's personal playing zone with private personal information and/or public personal information in it. Game terminal 104 may comprise a display screen 802 (e. g., TFT-LCD panel, OLED display or electronic paper or any other type of flat-panel display) for displaying a terminal view layout, and different game objects and graphic elements. A touch panel 804 may cover all or most of the display screen 802's surface, providing input means to the players. Other components of the game terminal 104 include a keypad 812, a video controller unit 808, a touch panel controller 810, a central processing unit 814 (which may include a graphic processing unit GPU), random access memory (RAM) 816, flash memory 817, a battery pack 822, a power jack 824, a power switch 826, a wireless communication unit 832, a wired communication unit 830, one or more connectors/sockets 828 (to couple via cable to the game board 102), etc. Other optional/additional components not specifically shown in FIG. 8 may include a microphone (for voice recognition interface), a speaker, a vibrator for associating haptic feedback with the touch panel 804, an accelerometer to enable player input by movement detection, etc. Persons skilled in the art will recognize that not all of the above components are necessary in all embodiments, and there may be additional components in certain embodiments, but the scope of the invention is not limited by the cited example components. Terminal battery pack 822 may receive power from main board 102 through appropriate connectors/cables.

Figure 8A:
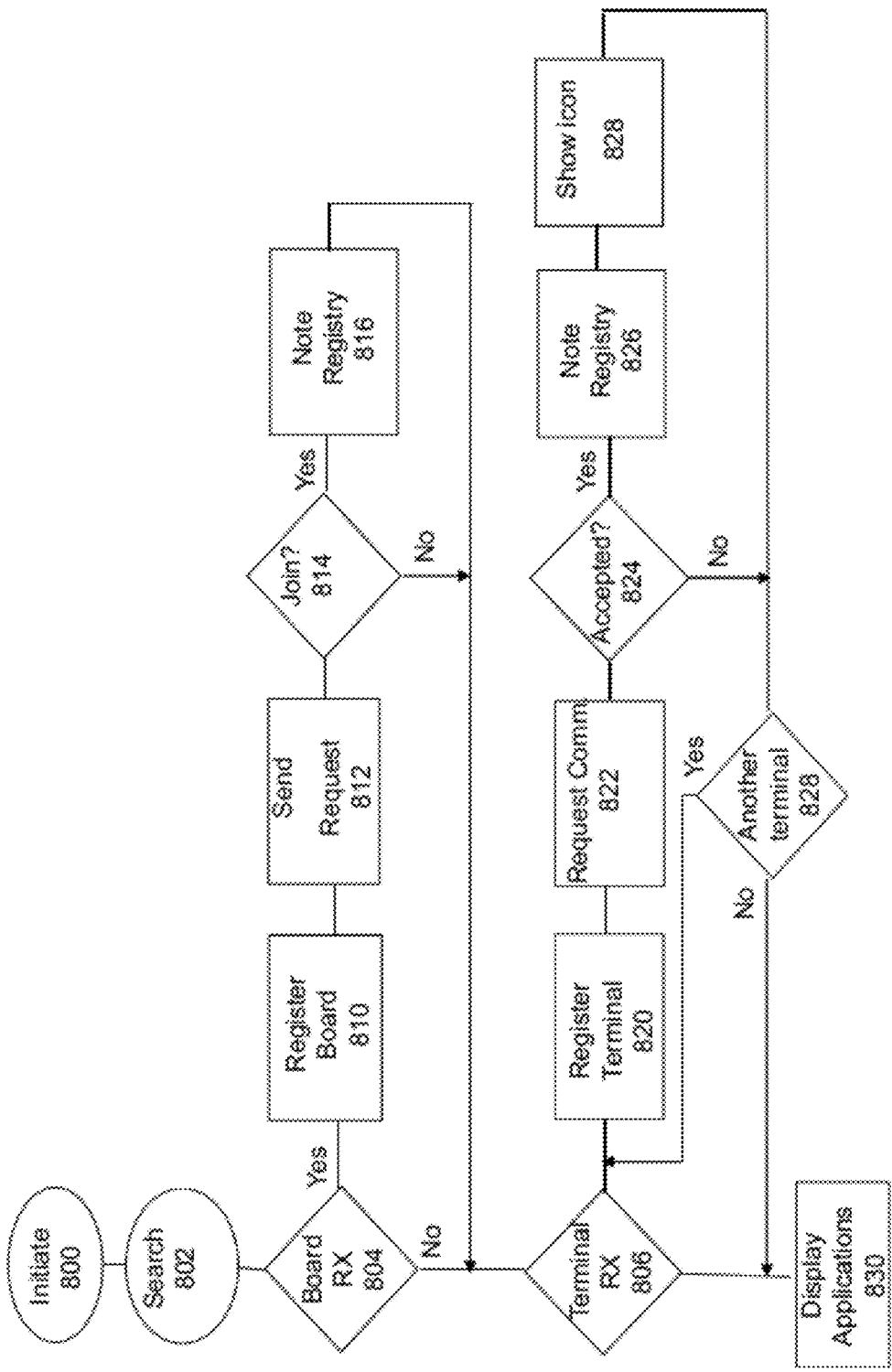
FIG. 8A illustrates an example of a process executed by the CPU for initiating a game session.

The game application runs on the CPU 814 via the OS and augmentation layer, so as to make the CPU 814 execute various operations in conjunction with the other elements of the terminal. The communication may be made over a bus 841, such that the CPU 814 can send or receive communication from connector 828, wireless and wired units 830 and 832, receive input from the keypad 812, and send sounds to the speaker 806, etc. FIG. 8A illustrates an example of a process executed by the CPU 814 for initiating a game session. The process initiates at Step 800 and at Step 802 the CPU searches for available boards by, for example, listening for a broadcasting signal received over the wireless unit 832. At Step 804 the terminal checks whether the wireless unit 832 received any communication from a board and, if so, it continues to sub-routine at Step 810 by registering the properties of the board in its memory, e.g., RAM 816. At Step 812 the terminal sends a request to the board to join the session. If at Step 814 the terminal receives a signal from the board that indicates that the terminal may join the session, the CPU 814 updates a registry at Step 816 to indicate that terminal has been accepted to participate in a session with that specific board. At Step 806, the terminal checks whether any other terminals are available to join the session. This information would generally be provided from the main board/console. If so, it executes a subroutine starting at Step 820 where the CPU registers the terminal's properties in its memory, e.g., RAM 816. At Step 822 the terminal sends a signal to the other terminal requesting to establish communication. This can be done by communicating via the main board. If at Step 824 the other terminal indicates that it accepts the invitation, the CPU updates a registry at Step 826 to indicate that the terminal may participate in the session. At Step 828 the CPU checks to see whether yet another terminal is available to join and, if so, reverts to Step 820. Otherwise, it continues to Step 830, wherein, if a user selects a game form the displayed application, the CPU 814 receives a signal from the board indicating the initial properties (available currency, cards, lives, turn in the game, etc.) of the terminal according to the game application.

Smart Mobile Device as Game Terminal

As discussed before, instead of a dedicated game terminal provided by the gaming system, smart mobile devices, such as, smart phones, smart media players, PDAs, etc. may be used as game terminals. FIG. 9 shows smart phones 904a-b interacting with a game board 602.

In case a smart mobile device is used as the terminal, an application software running on the mobile device will implement all the standard terminal protocols to communicate with the game board.

In addition, the application software running on the mobile device, upon registration, may report to the game board the device's physical properties (such as, screen size and resolution details) in order to allow the game board application software to tailor the relevant properties to the device' attributes.

Packaging of the System

The game board display units may be hingedly pre-attached to each other, and placed in an external casing device such as a folding plastic case to allow a convenient method of storing and deploying several units. For example, in a two-screen device, when the external casing is folded, the two units are vertically stacked against each other with the display screens facing each other.

Another packaging method is to include magnetic and/or mechanical contactors around the periphery of the display screen of each detached game board display unit, so that when two display units are stacked on top of each other, the corresponding display screens face each other and are held together by the contactors.

The game terminals may be placed on one of the game board display unit's back plane, and may be held securely by magnetic and/or mechanical contactors.

The scope of the invention is not limited by the packaging and storing method. However, in various embodiments of the present invention, game boards 102 and game terminals 104 are designed to facilitate easy storing and easy deployment.

Examples of Player Interaction

This section discusses various examples interaction methods used by the players, which the system interprets as appropriate commands. Most of these interactive methods are associated with finger gestures on a touch screen, but persons skilled in the art would understand that these illustrative examples are not limiting the scope of the invention.

Drag—When using a movable game object like a scrabble tile or chess piece, the player touches the piece and while touching it, moves the finger along the display area. The selected object will follow the finger as long as it touches the screen surface. Depending on the game specifics, the object will may stay (graphically) on the game surface (e.g., in a chess game), may be "lifted up" when moving around to avoid collision with other objects (e.g., in the Checkers game). In case multiple display units are involved, the moving game object may be moved from one display unit to the other by continuous "dragging" across the boards.

Spin—When using a spinning object like a roulette wheel or carousel, the player touches the object and while touching it, moves the finger in the spin direction and then lifts the finger up. The object will start spinning to the selected direction using the finger movement speed to determine the spinning speed.

Throw—When using a game piece that requires the player to throw it across the board, like a dice, the player touches the object, which will graphically "elevate". While touching the object, the player moves the finger in the throwing direction. The object will follow the finger moving velocity and direction, and the moment of release to determine the bouncing scheme. In case the object collides with other game objects, it will change its direction accordingly until it will come to a halt. If an accelerometer is incorporated into the handheld device, the user may simply shake the handheld device, e.g., to shake the dice, and then gesture as if to spill the dice out of the handheld device.

Object exchange between different modules—In order to move objects from the shared public zone to a personal public/private zone, and vice versa, one option is to graphically define a "gate" on the display area. Once the object is dragged into the players "gate", it will disappear and reappear onto another display screen. To move from the terminal to the board, the player will drag the object towards a physical boundary of the display screen, and once most of the object body will cross the border, it will disappear from the terminal and reappear at the player's "gate" on the main board. The gate may be located near the terminal's cable socket or location.

Page Flip—In case an game object resembling a page, a page flipping emulation can be done by touching the page corner and moving it to the opposite direction Collision—In case two objects are colliding, collision behavior may be emulated with visual, audio, or audio-visual effects.

Push—When a finger is moved gently touching a movable object, the object will be 'pushed' along with the finger movement.

Hit—Unlike the push gesture, in case the finger moves fast enough when touching a movable object, the impact will simulate a hit, where the object will bounce to the finger's movement direction.

Flip—In order to flip a card or tile, the finger will touch the object's center and while touching, will move fast toward one of the card edges and then will release the touch. The object will be flipped with animation effect.

Write—Using a stylus pen or finger on a predefined area, the player can write or draw, if required by the game.

Zoom out and in—Using finger pinching or expansion, a player may zoon out or in on certain portion of a game surface.

Rotate board—Special control on the board, on the user terminal, or gesture on the board layout enables to rotate the entire board and pieces to the user side. The same function may take place automatically when the user turn arrives as part of the game play.

Physical buttons or keypads, mouse, virtual keyboards, joysticks, trackballs, touch pads, etc. may be used instead of a touch screen to interact with graphical objects on a display screen.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of functional elements will be suitable for practicing the present invention. Moreover, other implementations of the invention will be apparent to those skilled in the art from consideration of the specification and practice of the invention disclosed herein. Various aspects and/or components of the described embodiments may be used singly or in any combination in the relevant arts. It is intended that the specification and examples be considered as exemplary only, with a true scope and spirit of the invention being indicated by the following claims.

The invention claimed is:

1. An electronic gaming system configured for executing an electronic game using physical gadget, comprising:
    a physical gadget comprising a wireless transmitter for transmitting an outcome value;
    a main console comprising:
        a processor configured for initiating the game, manage flow of the game according to game rules, and update status of the game;
        a native operating system (OS) executing on the processor and providing operating system services;
        a game application executing on the processor and receiving services from the native OS;
        a monitor interface in communication with a main monitor and delivering game graphics to the main monitor;
        a user interface receiving input from a user and providing the input to the processor to manage flow of the game using the input; and,
        a wireless communication interface receiving the outcome value over wireless communication from the gadget and delivering the outcome value to the processor to advance the flow of the game according to the outcome value.

2. The system of claim 1, wherein the physical gadget comprises one of: a die, a clock, and a game piece.

3. The system of claim 1, wherein the gadget comprises a die, and wherein the outcome value comprises value shown by the die once the die lands.

4. The system of claim 1, wherein the physical gadget comprises a sand clock.

5. The system of claim 1, further comprising:
    a terminal comprising:
        a terminal monitor interface in communication with a terminal monitor and delivering terminal graphics of the game to be displayed on the terminal monitor;
        a terminal user interface;
        a terminal processor;
        a terminal native operating system (OS) executing on the processor and providing operating system services; and,
        a terminal communication interface enabling wireless communication between the terminal and the main console.

6. The system of claim 5, wherein the game graphics comprise public portion of the game and terminal graphics comprises private portion of the game.

7. A distributed gaming program comprising system package and terminal package, and having executable instructions that, when executed by an electronic system, causes the system to enable one or more players to play a game interactively by perform the tasks comprising:
    cause a main console to initiate a game, manage the game flow according to game rules, and update the game status;
    display graphics of the game on a main monitor coupled to the main console;
    display terminal graphics of the game on a terminal monitor of a mobile terminal;
    receive user input at the mobile terminal;
    exchange wireless communication between the main console and the mobile terminal; and,
    display a digital gadget on the terminal monitor, receive input from a user at the terminal, modify the display of the digital gadget according to the input, and transmit a signal to the main console to advance the game flow according to the input.

8. The gaming program according to claim 7, wherein the digital gadget comprises a die, and wherein the program further causes the system to perform the tasks comprising:
    sensing shaking of the terminal;
    displaying on the terminal monitor simulation of shaking of the die according to the shaking of the terminal;
    sensing a spilling gesture and displaying on the terminal monitor spilling the die out of the terminal; and,
    transmitting data from the terminal and displaying on the main monitor graphics of the die rolling onto the main monitor.

9. The gaming program according to claim 7, wherein the program further causes the system to perform the tasks comprising:
    cause the main console to render at least one game widget usable for a particular game;
    cause the main console to render at least one game object.

10. The gaming program according to claim 7, wherein the program further causes the system to perform the tasks comprising:
    causing the main console to maintain moving rules associated with each game object.

11. The gaming program according to claim 7, wherein the program further causes the system to perform the tasks comprising:
    causing the main console to maintain visual rules associated with each game object.

12. The gaming program according to claim 7, wherein the program further causes the system to perform the tasks comprising:

causing the main console to maintain impact rules associated with each game object.

13. An electronic gaming system configured for executing an electronic game using physical gadget, comprising:
- a physical gadget having a wireless transmitter for transmitting an outcome value;
- a main console, comprising:
  - a processor configured for initiating the game, manage flow of the game according to game rules, and update status of the game; and,
  - a wireless communication interface receiving the outcome value from the gadget over wireless communication and delivering the outcome value to the processor to advance the flow of the game according to the outcome value;
- a terminal comprising a terminal communication interface enabling wireless communication between the terminal and the main console.

14. The system of claim 13, wherein the wireless transmitter comprises a Bluetooth transmitter.

15. The system of claim 13, wherein the gadget comprises an avatar.

16. The system of claim 13, wherein the physical gadget comprises a physical die configured for wirelessly transmitting its value once it lands.

17. The system of claim 13, wherein the physical gadget comprises a timer configured for wirelessly transmitting its time value.

18. The system of claim 13, wherein the physical gadget comprises a sand clock configured for wirelessly transmitting its value.

19. The system of claim 13, wherein the physical gadget comprises a game piece configured for wirelessly transmitting its value.

20. The system of claim 13, wherein the terminal communication interface is configured for wirelessly transferring digital game objects between the terminal and the main console.

* * * * *